(12) United States Patent
Noguchi et al.

(10) Patent No.: US 10,656,740 B2
(45) Date of Patent: May 19, 2020

(54) SENSOR-EQUIPPED DISPLAY DEVICE

(71) Applicant: Japan Display Inc., Tokyo (JP)

(72) Inventors: Koji Noguchi, Tokyo (JP); Masaki Murase, Tokyo (JP); Yasushi Nakano, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 109 days.

(21) Appl. No.: 15/408,807

(22) Filed: Jan. 18, 2017

(65) Prior Publication Data
US 2017/0205926 A1    Jul. 20, 2017

(30) Foreign Application Priority Data

Jan. 19, 2016   (JP) .................................. 2016-007813

(51) Int. Cl.
*G06F 3/041*     (2006.01)
*G02F 1/1333*    (2006.01)
*G02F 1/1343*    (2006.01)
*G02F 1/1345*    (2006.01)
*G02F 1/1362*    (2006.01)
*G06F 3/044*     (2006.01)

(52) U.S. Cl.
CPC ........ *G06F 3/0412* (2013.01); *G02F 1/13338* (2013.01); *G02F 1/13452* (2013.01); *G02F 1/133305* (2013.01); *G02F 1/134309* (2013.01); *G02F 1/136286* (2013.01); *G06F 3/044* (2013.01); *G06F 3/0416* (2013.01); *G02F 2201/121* (2013.01); *G06F 2203/04102* (2013.01)

(58) Field of Classification Search
None
See application file for complete search history.

(56) References Cited

U.S. PATENT DOCUMENTS

2002/0018169 A1    2/2002   Kato
2002/0044251 A1    4/2002   Togashi et al.
(Continued)

FOREIGN PATENT DOCUMENTS

JP     2001-215892     8/2001
JP     2002-189229     7/2002
(Continued)

OTHER PUBLICATIONS

Notice of Reasons for Refusal issued in connection with Japanese Patent Application No. 2016-007813 dated Mar. 5, 2019. (6 pages).
(Continued)

*Primary Examiner* — Matthew Yeung
(74) *Attorney, Agent, or Firm* — K&L Gates LLP

(57)     ABSTRACT

According to one embodiment, a sensor-equipped display device includes a first substrate includes a first area and a second area adjacent to the first area, the first substrate includes a first terminal and a second terminal which are located in the first area, and a first wiring which electrically connects the first terminal and the second terminal, a second substrate includes a detection electrode, and a third terminal electrically connected to the detection electrode, and a connecting member which electrically connects the first terminal and the third terminal, at least a part of the first wiring being extended from the first terminal toward the second area.

18 Claims, 21 Drawing Sheets

(56) References Cited

U.S. PATENT DOCUMENTS

| | | | |
|---|---|---|---|
| 2004/0070572 A1* | 4/2004 | Nakajima | G06F 3/041 345/173 |
| 2009/0194342 A1* | 8/2009 | Kuo | G06F 3/0412 178/18.03 |
| 2009/0284909 A1* | 11/2009 | Liu | G02F 1/1345 361/679.21 |
| 2010/0238134 A1* | 9/2010 | Day | G06F 3/0412 345/174 |
| 2011/0069036 A1 | 3/2011 | Anno | |
| 2011/0134056 A1* | 6/2011 | Kim | G06F 3/0412 345/173 |
| 2012/0319967 A1* | 12/2012 | Tsai | G06F 1/1626 345/173 |
| 2014/0292686 A1 | 10/2014 | Yamamoto et al. | |

FOREIGN PATENT DOCUMENTS

| | | |
|---|---|---|
| JP | 2011-65515 | 3/2011 |
| JP | 2014-106664 A | 6/2014 |
| JP | 2014-120003 A | 6/2014 |
| JP | 2014-199279 | 10/2014 |
| JP | 2015-232819 A | 12/2015 |
| WO | 2013/042646 | 3/2013 |

OTHER PUBLICATIONS

Chinese Office Action dated Feb. 3, 2020 in corresponding Chinese Application No. 20170036736.8.

Japanese Office Action dated Apr. 7, 2020 in corresponding Japanese Application No. 2019-105998.

* cited by examiner

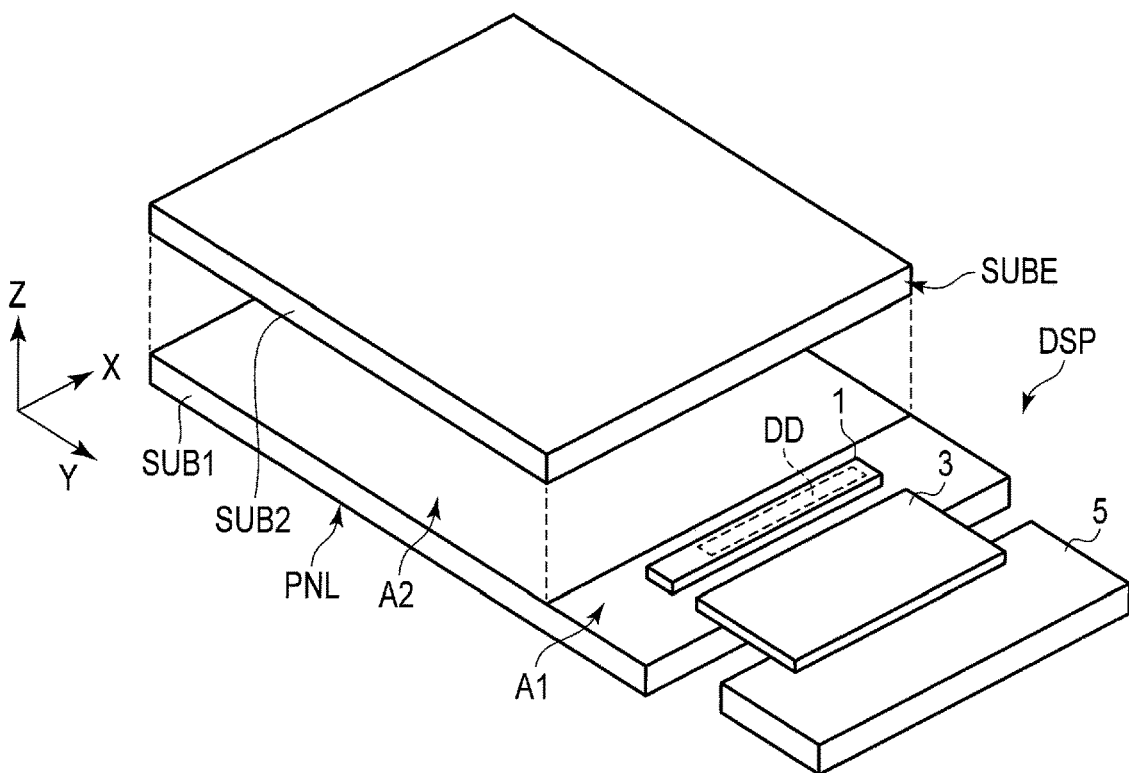
F I G. 1
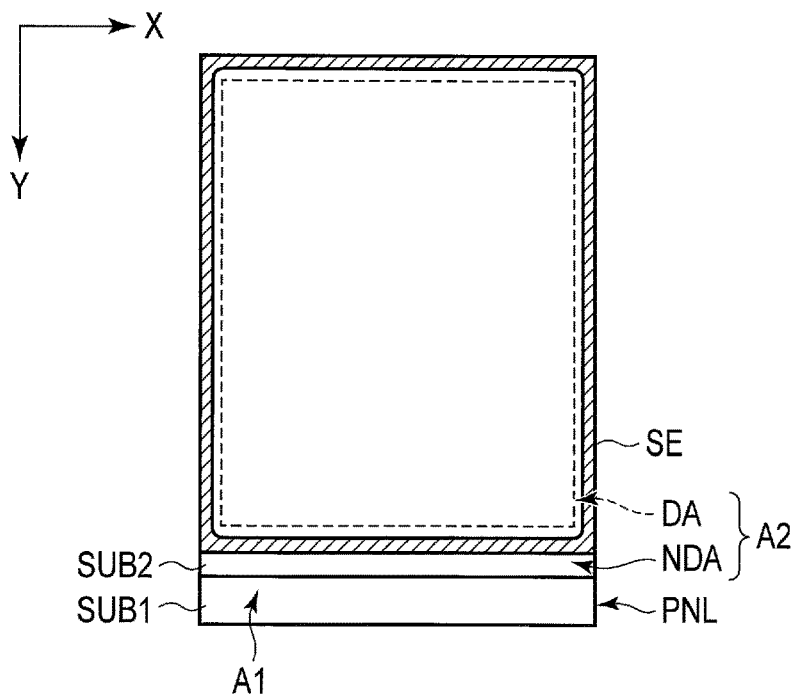
F I G. 2

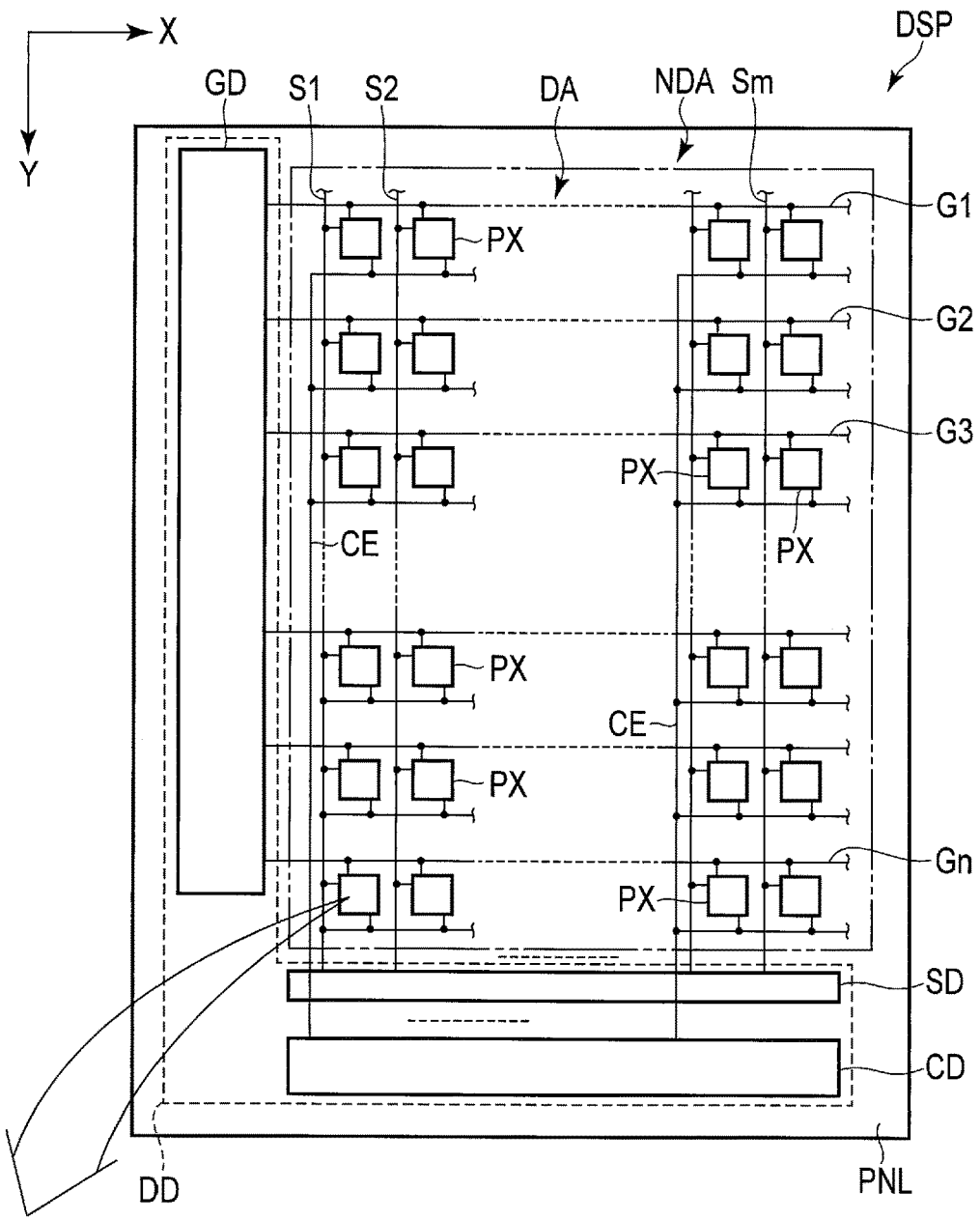
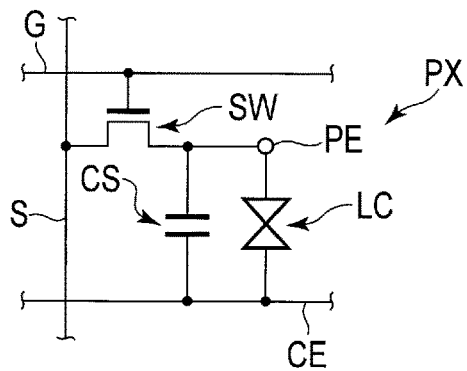
F I G. 3

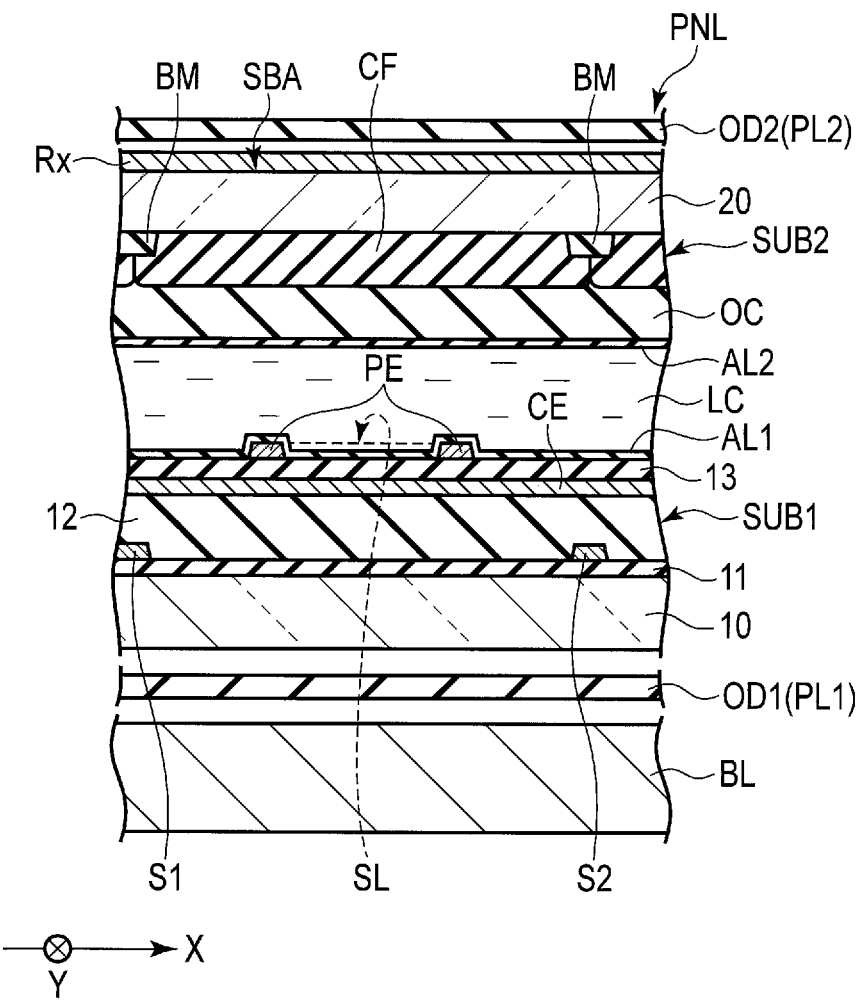
F I G. 4

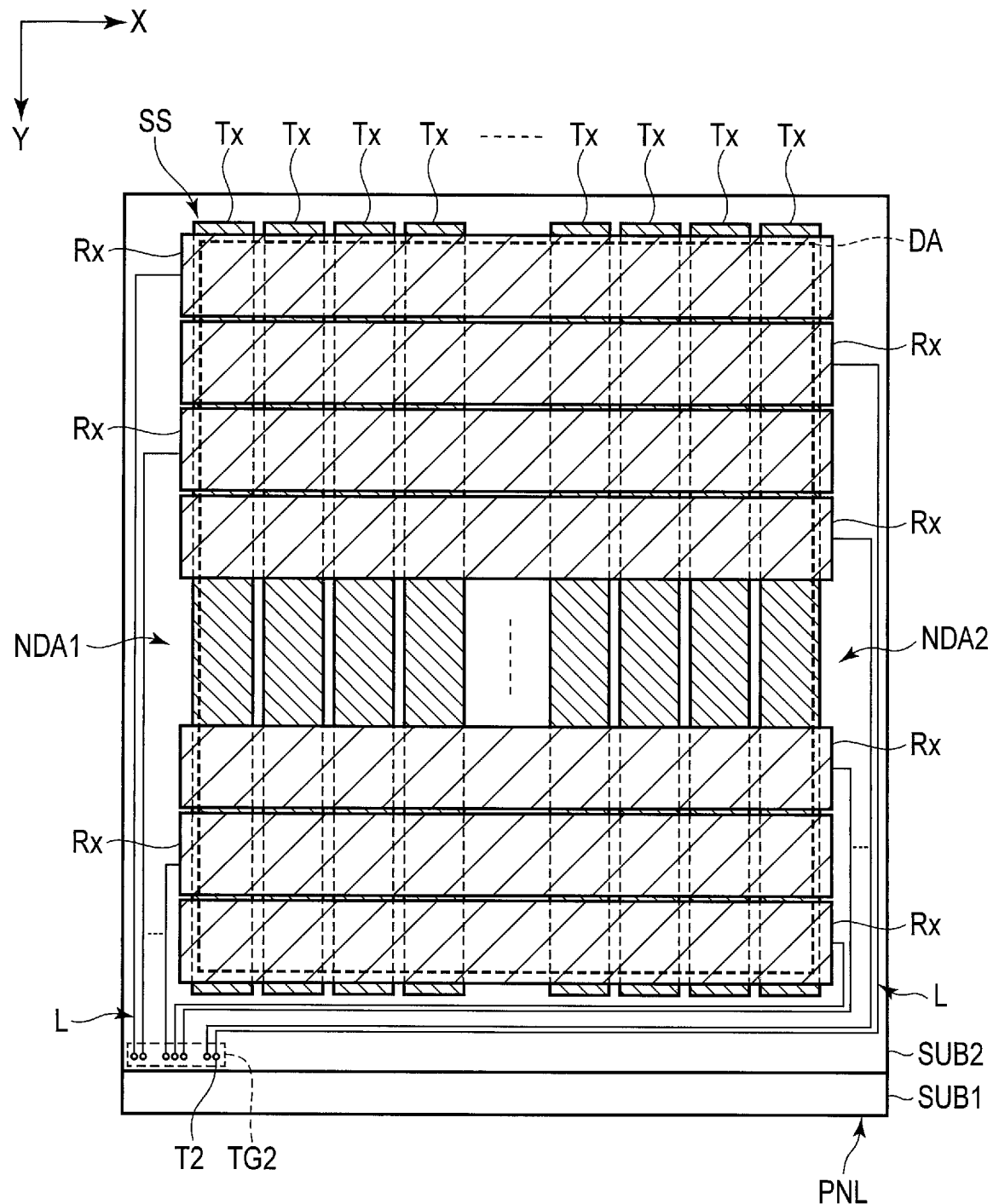
F I G. 6

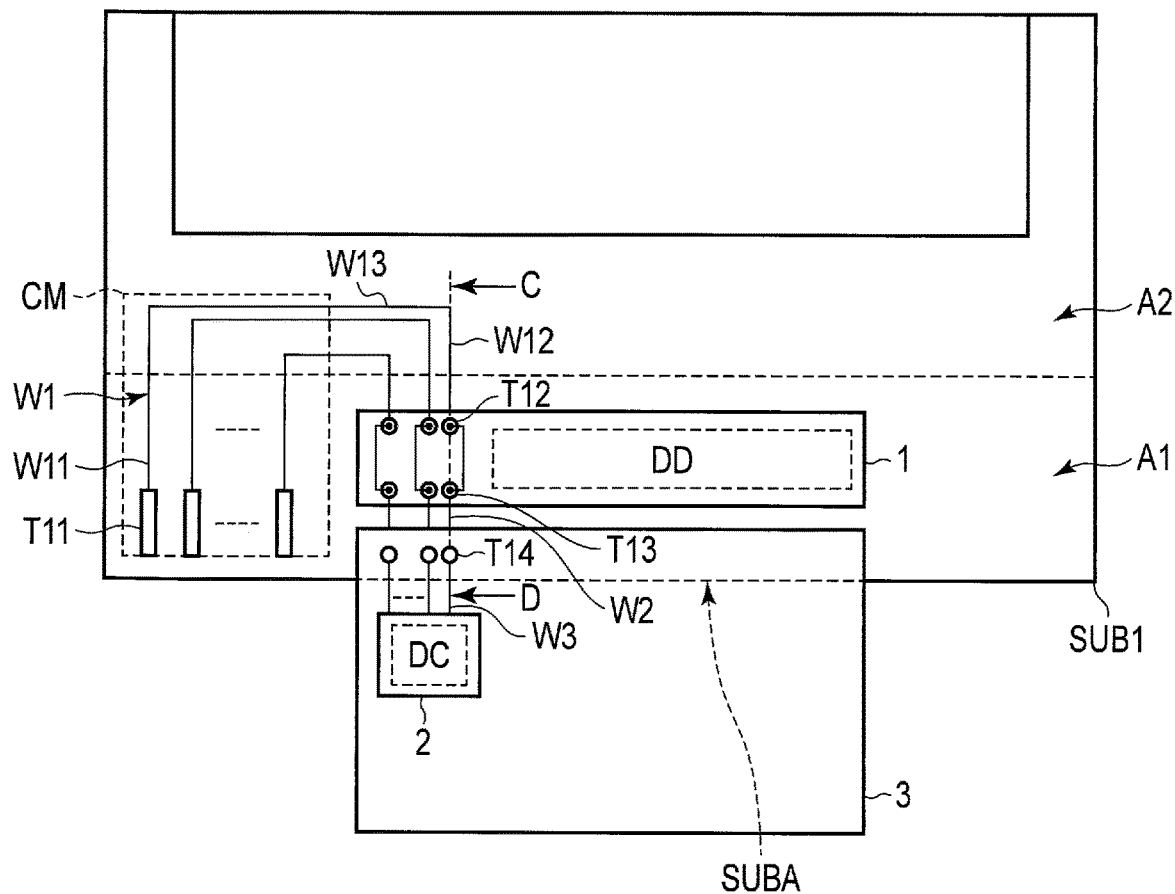
F I G. 12
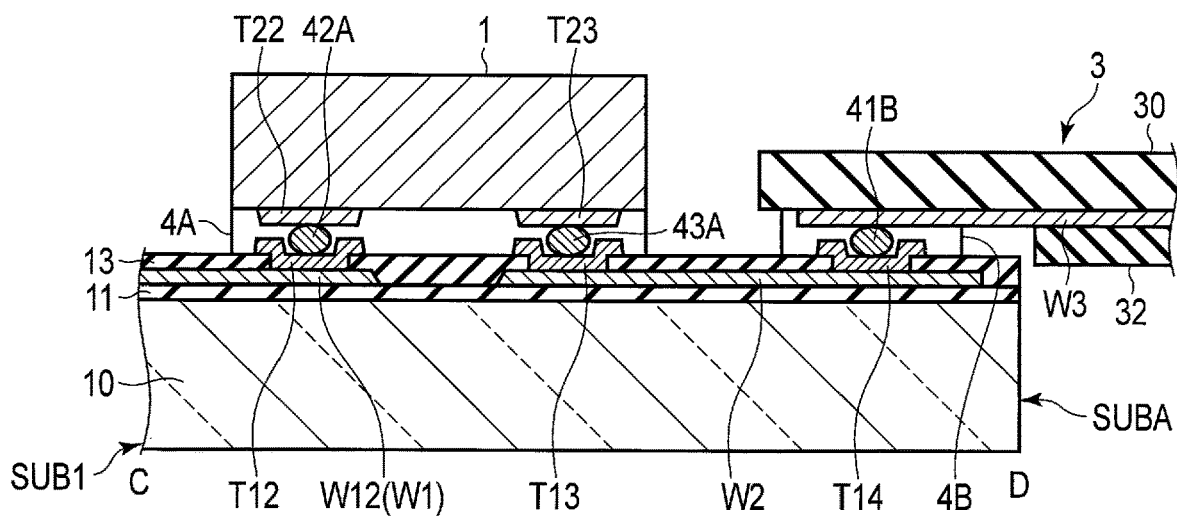
F I G. 13

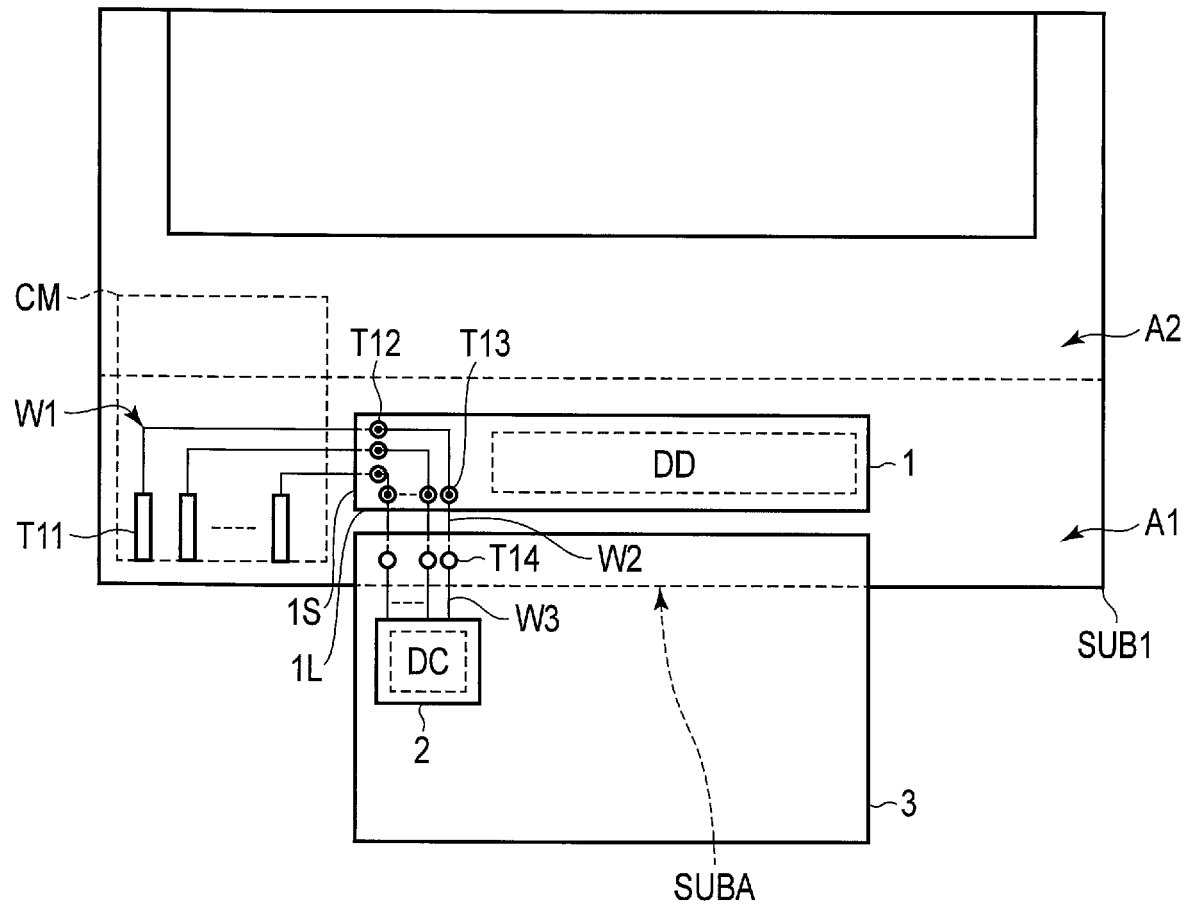
F I G. 15

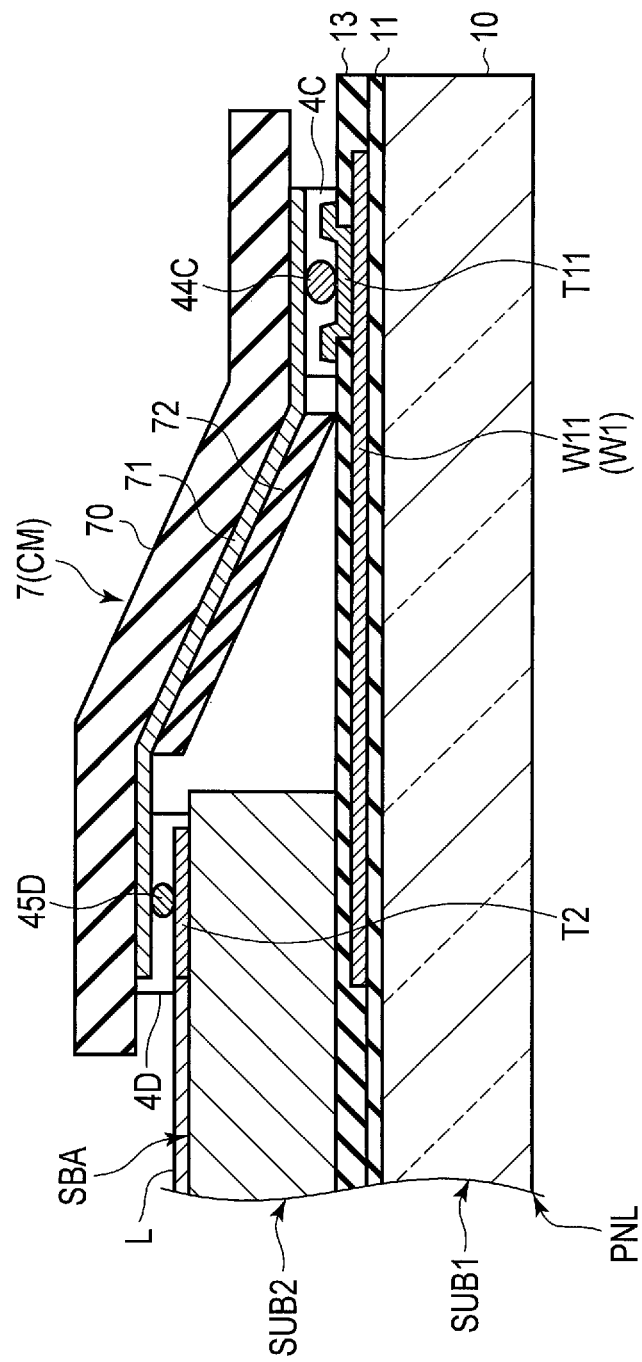
F I G. 19A

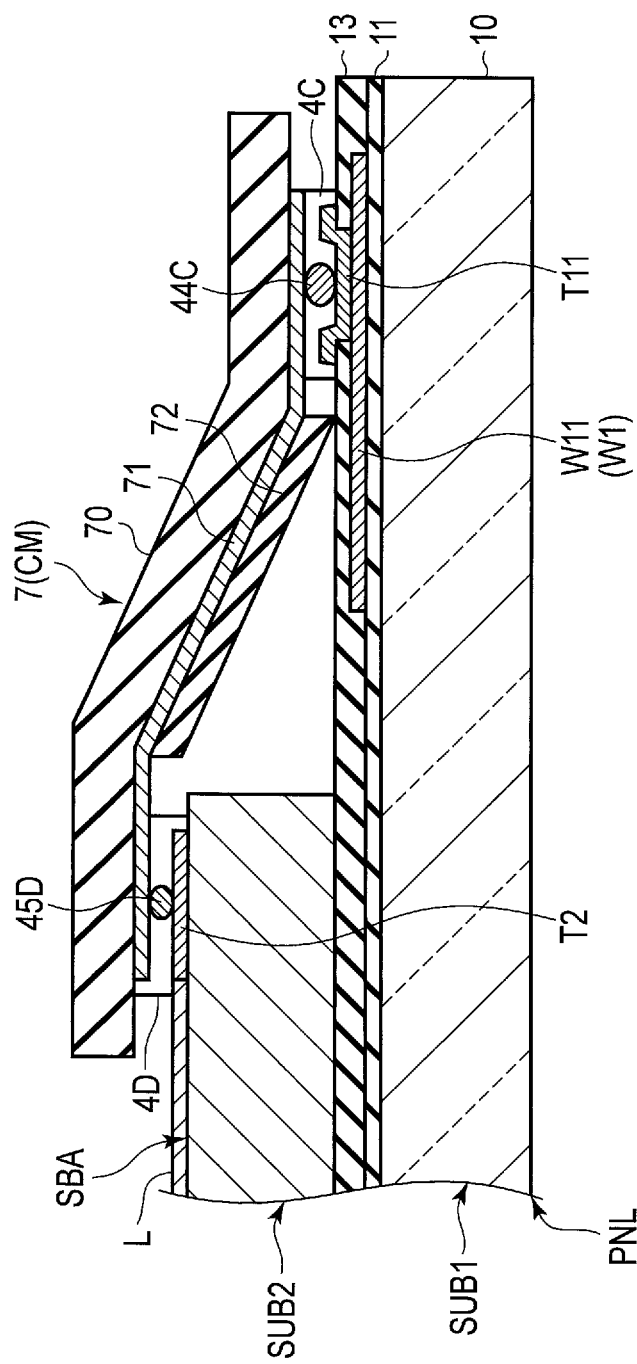
F I G. 19B

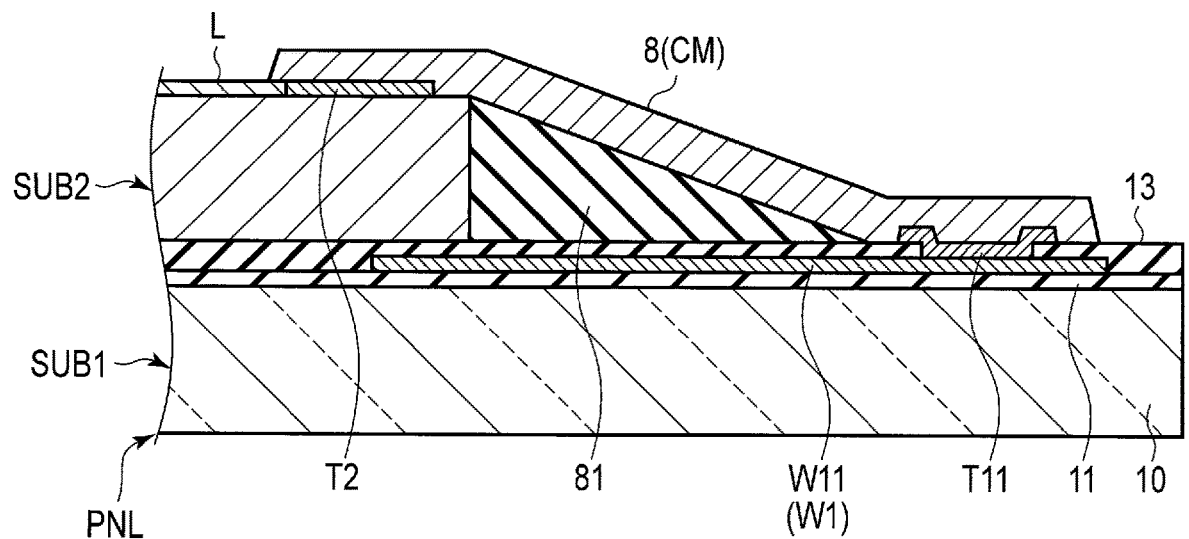
F I G. 20A
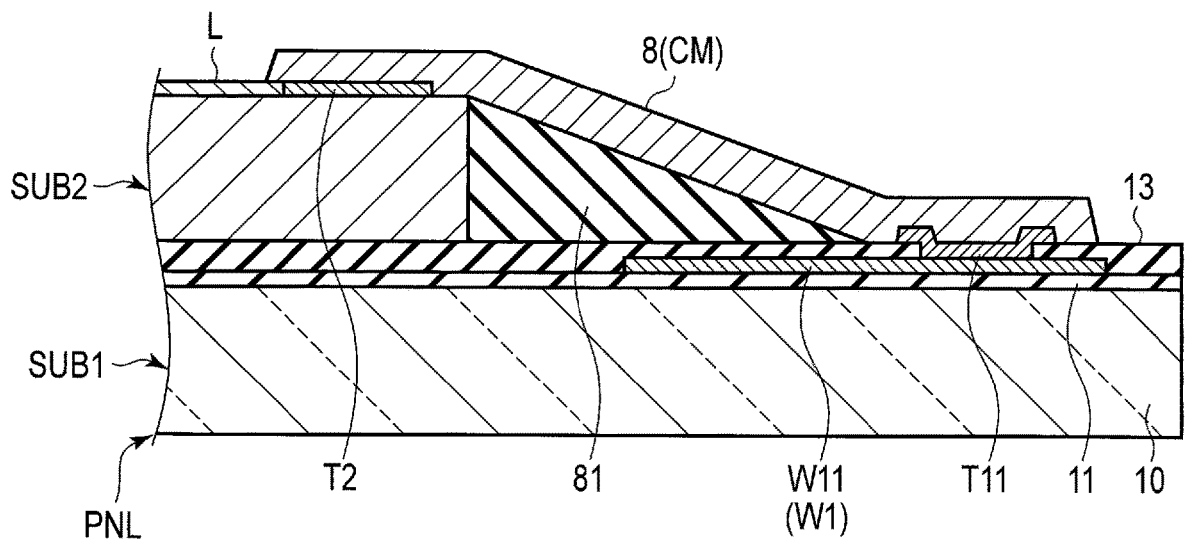
F I G. 20B

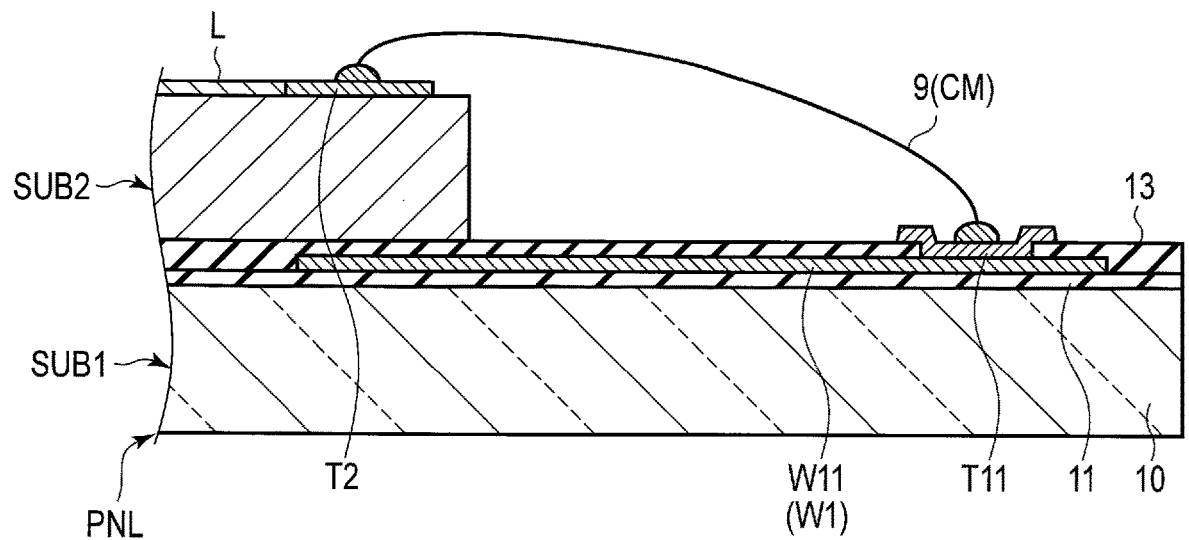
F I G. 21A
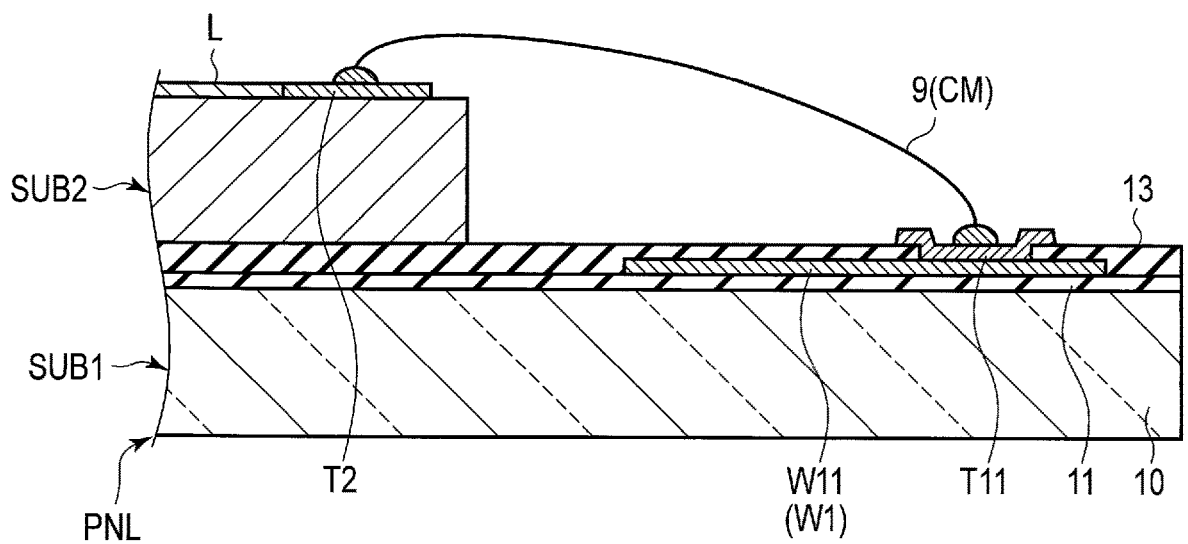
F I G. 21B

SENSOR-EQUIPPED DISPLAY DEVICE

CROSS-REFERENCE TO RELATED APPLICATIONS

This application is based upon and claims the benefit of priority from Japanese Patent Application No. 2016-007813, filed Jan. 19, 2016, the entire contents of which are incorporated herein by reference.

FIELD

Embodiments described herein relate generally to a sensor-equipped display device.

BACKGROUND

Recently, sensors capable of detecting contact or approach of an object to be detected such as a finger have been put into practical use as a display device interface or the like. A capacitive touch panel, which is an example of the sensors, comprises an electrode for detecting a change in the electrostatic capacitance caused by the object to be detected. In a display device including such a touch panel, in addition to a flexible printed circuit connected to a display panel, a flexible printed circuit connected to a surface on which an electrode of the touch panel is formed is required.

SUMMARY

The present application relates generally to a sensor-equipped display device.

According to one embodiment, a sensor-equipped display device includes a first substrate includes a first area and a second area adjacent to the first area, the first substrate includes a first terminal and a second terminal which are located in the first area, and a first wiring which electrically connects the first terminal and the second terminal, a second substrate includes a detection electrode, and a third terminal electrically connected to the detection electrode, and a connecting member which electrically connects the first terminal and the third terminal, at least a part of the first wiring being extended from the first terminal toward the second area.

BRIEF DESCRIPTION OF THE DRAWINGS

FIG. 1 is a perspective view showing the structure of a display device DSP of the present embodiment.

FIG. 2 is a plan view showing a display panel PNL shown in FIG. 1.

FIG. 3 is a diagram showing a basic structure and an equivalent circuit of the display panel PNL shown in FIG. 1.

FIG. 4 is a cross-sectional view showing the structure of a part of the display panel PNL shown in FIG. 1.

FIG. 6 is a plan view showing a configuration example of the sensor SS.

FIG. 12 is a plan view showing another configuration example of the first substrate SUB1 shown in FIG. 9.

FIG. 13 is a cross-sectional view of the first substrate SUB1 taken along line C-D shown in FIG. 12.

FIG. 15 is a plan view showing yet another configuration example of the first substrate SUB1 shown in FIG. 9.

FIG. 19A is a cross-sectional view showing a configuration example of a connecting member CM applicable to the present embodiment.

FIG. 19B is a cross-sectional view showing another configuration example of the connecting member CM applicable to the present embodiment.

FIG. 20A is a cross-sectional view showing yet another configuration example of the connecting member CM applicable to the present embodiment.

FIG. 20B is a cross-sectional view showing yet another configuration example of the connecting member CM applicable to the present embodiment.

FIG. 21A is a cross-sectional view showing yet another configuration example of the connecting member CM applicable to the present embodiment.

FIG. 21B is a cross-sectional view showing yet another configuration example of the connecting member CM applicable to the present embodiment.

DETAILED DESCRIPTION

Figure 5:
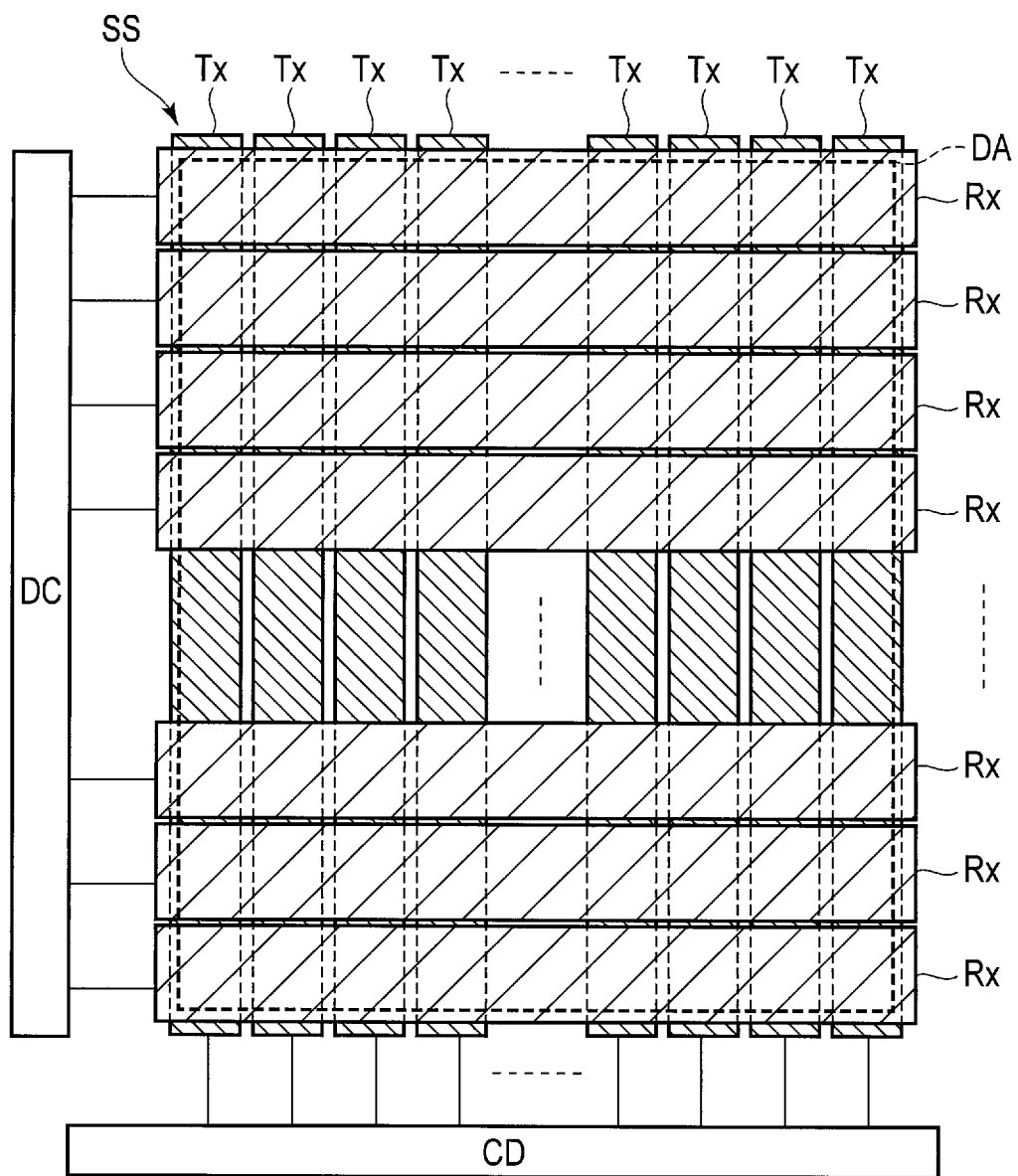
FIG. 5 is an illustration showing the structure of a sensor SS.

In general, according to one embodiment, a sensor-equipped display device includes: a first substrate comprising a first area and a second area adjacent to the first area, the first substrate comprising a first terminal and a second terminal which are located in the first area, and a first wiring which electrically connects the first terminal and the second terminal; a second substrate opposed to the second area, the second substrate comprising a detection electrode which outputs a sensor signal necessary for sensing, and a third terminal electrically connected to the detection electrode; a connecting member which electrically connects the first terminal and the third terminal; and a detection circuit which is electrically connected to the first wiring, and reads the sensor signal output from the detection electrode, at least a part of the first wiring being extended from the first terminal toward the second area.

According to another embodiment, a sensor-equipped display device includes: a first substrate comprising a first area and a second area adjacent to the first area, the first substrate comprising first and second terminals located in the first area, and a first wiring which electrically connects the first terminal and the second terminal; a second substrate opposed to the second area, the second substrate comprising a detection electrode which outputs a sensor signal necessary for sensing, and a third terminal electrically connected to the detection electrode; a connecting member which electrically connects the first terminal and the third terminal; and a detection circuit electrically connected to the first wiring.

According to yet another embodiment, a sensor-equipped display device includes: a first substrate comprising a first area and a second area including a display area adjacent to the first area, the first substrate comprising first and second terminals located in the first area, a first wiring which electrically connects the first terminal and the second terminal, and a sensor driving electrode located in the second area and including a common electrode arranged over a plurality of pixels; a second substrate opposed to the second area, the second substrate comprising a detection electrode opposed to the sensor driving electrode, and a third terminal electrically connected to the detection electrode; a connecting member which electrically connects the first terminal and the third terminal; a common electrode drive circuit electrically connected to the sensor driving electrode; and a detection circuit electrically connected to the second terminal.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements, which have functions identical or similar to the functions described in connection with preceding drawings, are denoted by the same reference numbers, and a duplicated detailed description thereof may be arbitrarily omitted.

FIG. 1 is a perspective view showing the structure of a display device DSP of the present embodiment. In the figure, a first direction X and a second direction Y are directions intersecting each other, and a third direction Z is a direction intersecting the first direction X and the second direction Y. In one example, the first direction X, the second direction Y, and the third direction Z are orthogonal to each other. In the present specification, a direction toward a pointing end of an arrow indicating the third direction Z is referred to as upward (or merely above), and a direction toward the opposite side from the pointing end of the arrow is referred to as downward (or merely below). Further, it is assumed that an observation position at which the display device DSP is to be observed is at the pointing end side of the arrow indicating the third direction Z, and a view toward an X-Y plane defined by the first direction X and the second direction Y is called a planar view.

In the present embodiment, a liquid crystal display device is explained as an example of the display device. Note that the main structures disclosed in the present embodiment are applicable to various display devices such as a self-luminous display device with organic electroluminescent display elements and the like, an electronic paper display device with electrophoretic elements and the like, a display device utilizing micro-electromechanical systems (MEMS), and a display device employing electrochromism.

The display device DSP comprises a display panel PNL, a driving IC chip (a first control unit) 1, a flexible substrate 3, etc. The display panel PNL described in this specification is a liquid crystal display panel, and includes a first substrate SUB1, a second substrate SUB2, and a liquid crystal layer (a liquid crystal layer LC which will be later). The first substrate SUB1 includes a first area A1 and a second area A2. The first area A1 and the second area A2 are adjacent to each other in the second direction Y. The second substrate SUB2 is opposed to the second area A2 of the first substrate SUB1. That is, the second area A2 is an area of the first substrate SUB1 which is opposed to the second substrate SUB2, and the first area A1 is an area of the first substrate SUB1 which extends to an outer side of an end portion SUBE of the second substrate SUB2.

The driving IC chip 1 and the flexible substrate 3 are connected to the first area A1. The driving IC chip 1, for example, includes a display driver DD which outputs a signal necessary for displaying an image on the display panel PNL. The display driver DD described in this specification includes at least a part of a signal line drive circuit SD, a scanning line drive circuit GD, and a common electrode drive circuit CD, which will be described later. The flexible substrate 3 connects the display panel PNL and an external circuit board 5.

FIG. 2 is a plan view showing the display panel shown in FIG. 1.

The first substrate SUB1 and the second substrate SUB2 are adhered to each other by a seal portion SE. The display panel PNL includes a display area DA in which an image is displayed, and a frame-like non-display area NDA which surrounds the display area DA. The display area DA is located at an inner side surrounded by the seal portion SE. The display area DA and the non-display area NDA are areas included in the second area A2 of the first substrate SUB1 shown in FIG. 1.

The display panel PNL of the present embodiment is a transmissive display panel having a transmissive display function of displaying an image by, for example, selectively passing light from a lower surface side of the first substrate SUB1, but is not limited to this. For example, the display panel PNL may be a reflective display panel having a reflective display function of displaying an image by selectively reflecting light from an upper surface side of the second substrate SUB2, or a transflective display panel including both the transmissive display function and the reflective display function.

FIG. 3 is an illustration showing a basic structure and an equivalent circuit of the display panel PNL shown in FIG. 1.

The display panel PNL includes a plurality of pixels PX in the display area DA. The pixels PX are arrayed in a matrix in the first direction X and the second direction Y. Also, the display panel PNL includes scanning lines G (G1 to Gn), signal lines S (S1 to Sm), a common electrode CE, etc., in the display area DA. The scanning lines G extend in the first direction X, and are arranged in the second direction Y. The signal lines S extend in the second direction Y, and are arranged in the first direction X. Note that the scanning lines G and the signal lines S do not necessarily extend linearly, and may be partially bent. The common electrode CE is disposed over the pixels PX.

The scanning lines G are connected to the scanning line drive circuit GD. The signal lines S are connected to the signal line drive circuit SD. The common electrode CE is connected to the common electrode drive circuit CD. The signal line drive circuit SD, the scanning line drive circuit GD, and the common electrode drive circuit CD may be disposed on the first substrate SUB1, or these circuits may be partly or entirely incorporated in the driving IC chip 1 illustrated in FIG. 1. Also, the layout of the drive circuits is not limited to the example illustrated. That is, for example, the scanning line drive circuits GD may be disposed on both sides of the display area DA so as to sandwich the display area DA.

Each pixel PX comprises a switching element SW, a pixel electrode PE, the common electrode CE, the liquid crystal layer LC, and the like. The switching element SW is constituted by a thin-film transistor (TFT), for example, and is electrically connected to the scanning line G and the signal line S. The pixel electrode PE is electrically connected to the switching element SW. The pixel electrode PE is opposed to the common electrode CE, and drives the liquid crystal layer LC by an electric field produced between the pixel electrode PE and the common electrode CE. A storage capacitance CS is formed between, for example, the common electrode CE and the pixel electrode PE.

FIG. 4 is a cross-sectional view showing the structure of a part of the display panel PNL illustrated in FIG. 1.

The illustrated display panel PNL has a structure corresponding to a display mode mainly using a lateral electric field which is substantially parallel to the main surface of the substrate, but the structure is not particularly limited. The display panel may have a structure corresponding to a display mode using a longitudinal electric field perpendicular to the main surface of the substrate, an oblique electric field inclined to the main surface of the substrate, or a combination of these electric fields. In the display mode using the lateral electric field, for example, a structure in which both the pixel electrode PE and the common electrode CE are provided on the first substrate SUB1 can be applied. In the display mode using the longitudinal electric field or the oblique electric field, a structure in which the pixel electrode PE is disposed in the first substrate SUB1 and the common electrode CE is disposed in the second substrate SUB2, for example, is applicable. It should be noted that the main surface of the substrate is a surface parallel to the X-Y plane.

The first substrate SUB1 includes a first insulating substrate 10, the signal lines S1 and S2, the common electrode CE, the pixel electrode PE, a first insulating film 11, a second insulating film 12, a third insulating film 13, a first alignment film AL1, and the like. In one example, the first insulating film 11 and the third insulating film 13 are formed of, for example, an inorganic material such as a silicon oxide or a silicon nitride, and the second insulating film 12 is formed of an organic material such as an acrylic resin. Note that illustrations of the switching element, the scanning line, and various other insulating films interposed between the switching element and the scanning line are omitted.

The first insulating substrate 10 is a light transmissive substrate such as a glass substrate or a resin substrate. The first insulating film 11 is located on the first insulating substrate 10. The signal lines S1 and S2 are located on the first insulating film 11. The second insulating film 12 is located on the signal lines S1 and S2, and the first insulating film 11. The common electrode CE is located on the second insulating film 12. The third insulating film 13 is located on the common electrode CE and the second insulating film 12. The pixel electrode PE is located on the third insulating film 13. The pixel electrode PE is opposed to the common electrode CE via the third insulating film. Furthermore, the pixel electrode PE has a slit SL at a position opposed to the common electrode CE. The common electrode CE and the pixel electrode PE are formed of a transparent conductive material such as indium-tin-oxide (ITO) or indium-zinc-oxide (IZO). The first alignment film AL1 covers the pixel electrode PE and the third insulating film 13.

Note that the pixel electrode PE may be located between the second insulating film 12 and the third insulating film 13, and the common electrode CE may be located between the third insulating film 13 and the first alignment film AL1. In this case, the pixel electrode PE is formed in a plate shape not including a slit in each pixel, and the common electrode CE includes slits opposed to the pixel electrode PE. Also, both of the pixel electrode PE and the common electrode CE may be located on the same layer. That is, for example, the pixel electrode PE and the common electrode CE may both be located between the third insulating film 13 and the first alignment film AL1.

The second substrate SUB2 comprises a second insulating substrate 20, a light-shielding layer BM, a color filter CF, an overcoat layer OC, a second alignment film AL2, etc.

The second insulating substrate 20 is a light transmissive substrate such as a glass substrate or a resin substrate. The light-shielding layer BM and the color filter CF are located on the second insulating substrate 20 at the side opposed to the first substrate SUB1. The light-shielding layer BM is arranged at positions which delimit the pixels and are opposed to the signal lines S in the drawing. The color filter CF is arranged at a position opposed to the pixel electrode PE, and a part of the color filter CF overlaps the light-shielding layer BM. The color filter CF includes a red color filter, a green color filter, a blue color filter, and the like. The overcoat layer OC covers the color filter CF. The second alignment film AL2 covers the overcoat layer OC.

Note that the color filter CF may be arranged in the first substrate SUB1. Alternatively, instead of arranging the light-shielding layer BM, two or more color filters of different colors may be stacked on one another to reduce the transmittance, so that the stacked color filters function as a light-shielding layer. A white color filter or an uncolored resin material may be disposed on a pixel which exhibits white color, or the overcoat layer OC may be disposed without arranging any color filters.

A sensor mounted in the display device DSP of the present embodiment comprises a detection electrode Rx. In the example illustrated, the detection electrode Rx is located on an outer surface SBA of the second substrate SUB2. The detection electrode Rx is formed of a metal material such as aluminum (Al), titan (Ti), silver (Ag), molybdenum (Mo), tungsten (W), copper (Cu), or chrome (Cr), an alloy formed by combining these metal materials, a transparent oxide material such as ITO or IZO, a conductive organic material, a dispersing element of a fine conductive substance or the like.

Although no detailed description will be given, the detection electrode Rx may have a single-layer structure or a laminated structure in which a plurality of thin films are stacked. When the detection electrode Rx has a laminated structure, for example, a multilayer structure comprising an oxide conductive layer on a metal layer is applicable. When the detection electrode Rx is formed of an oxide conductive layer, the detection electrode Rx is formed in a strip shape, for example. When the detection electrode Rx is formed by a metal layer, the detection electrode Rx is formed of a thin metal wire, and is formed to be, for example, wavy, or in a lattice or mesh shape. The detection electrode Rx may be covered by a protective film where necessary.

A first optical element OD1 including a first polarizer PL1 is located between the first insulating substrate 10 and an illuminating unit BL. A second optical element OD2 including a second polarizer PL2 is located on the detection electrode Rx. Each of the first optical element OD1 and the second optical element OD2 may include a retardation film as needed. The first polarizer PL1 and the second polarizer PL2 are disposed to be, for example, in a crossed-Nicol relationship in which absorption axes of the respective polarizers are orthogonal to each other.

Next, a configuration example of a sensor SS mounted in the display device DSP of the present embodiment will be described. The sensor SS which will be described below is, for example, a capacitive sensor, which detects contact or approach of an object to be detected, based on a variation in the electrostatic capacitance between a pair of electrodes opposed to each other with a dielectric interposed therebetween.

FIG. 5 is an illustration showing the structure of the sensor SS.

In the present embodiment, the sensor SS comprises a sensor driving electrode (a first electrode) Tx and a detection electrode (a second electrode) Rx. The sensor driving electrode Tx includes the common electrode CE shown in FIG. 4, and are located between the second insulating film 12 and the third insulating film 13 in the first substrate SUB1. The detection electrode Rx is located on the outer surface SBA of the second substrate SUB2, as shown in FIG. 4.

The sensor driving electrode Tx and the detection electrode Rx are located in the display area DA. In the example illustrated, each of the sensor driving electrode Tx and the detection electrode Rx has a strip shape. A direction in which the sensor driving electrode Tx extends may be the first direction X shown in FIG. 3, or the second direction Y. The detection electrode Rx extends in a direction intersecting the sensor driving electrode Tx. For example, when the sensor driving electrodes Tx extend in the first direction X, and are arranged to be spaced apart from each other in the second direction Y, the detection electrodes Rx extend in the second direction Y, and are arranged to be spaced apart from each other in the first direction X. Meanwhile, when the detection electrodes Rx extend in the first direction X, and are arranged to be spaced apart from each other in the second direction Y, the sensor driving electrodes Tx extend in the second direction Y, and are arranged to be spaced apart from each other in the first direction X.

The sensor driving electrodes Tx are electrically connected to the common electrode drive circuit CD. The detection electrodes Rx are electrically connected to a detection circuit DC.

The common electrode drive circuit CD supplies a common drive signal to the sensor driving electrode Tx including the common electrode CE at a display drive time in which an image is displayed. Thereby, the sensor driving electrode Tx produces an electric field between the sensor driving electrode Tx and the pixel electrode PE, and drives the liquid crystal layer LC.

Also, the common electrode drive circuit CD supplies a sensor drive signal to each of the sensor driving electrodes Tx at a sensing drive time in which sensing is performed to detect contact or approach of the object to be detected. Thereby, the sensor driving electrode Tx produces capacitance between the sensor driving electrode Tx and the detection electrode Rx. Each of the detection electrodes Rx outputs a sensor signal necessary for sensing in accordance with the supply of the sensor drive signals to the sensor driving electrodes Tx. The sensor signal in this specification corresponds to a signal based on a change in the interelectrode capacitance between the sensor driving electrode Tx and the detection electrode Rx. The detection circuit DC reads the sensor signal from the detection electrode Rx, and detects the presence or absence of contact or approach of the object to be detected and also position coordinates, etc., of the object to be detected.

Note that the number, size, and shape of the sensor driving electrode Tx and the detection electrode Rx are not particularly limited, and can be changed variously. For example, the sensor driving electrode Tx may be formed in a single plate-like shape extending over the entire display area DA without being cut. Also, the detection electrodes Rx may be formed in an island shape and arrayed in a matrix in the first direction X and the second direction Y.

FIG. 6 is a plan view showing a configuration example of the sensor SS.

The detection electrodes Rx extend in the first direction X, and are arranged to be spaced apart from each other in the second direction Y. The sensor driving electrodes Tx extend in the second direction Y, and are arranged to be spaced apart from each other in the first direction X. Here, by focusing attention on the detection electrodes Rx and lead lines L, the specific layout will be described.

The lead lines L are located on the same plane as the one that the detection electrodes Rx are located on (for example, the outer surface SBA shown in FIG. 4) in the second substrate SUB2. Preferably, such lead lines L should be formed of a metal material having low resistance. In one example, the lead lines L are formed of a metal material such as aluminum (Al), titanium (Ti), silver (Ag), molybdenum (Mo), tungsten (W), copper (Cu) and chromium (Cr). One end of each of the lead lines L is electrically connected to the corresponding one of the detection electrodes Rx. The other end of each of the lead lines L is electrically connected to the corresponding one of terminals T2 in a terminal group TG2.

In the example illustrated, of the lead lines L, lead lines L connected to the odd-numbered detection electrodes Rx are located in a non-display area NDA1 on one side, and lead lines L connected to the even-numbered detection electrodes Rx are located in a non-display area NDA2 on the other side. The non-display area NDA1 intended here corresponds to a non-display area on the left side of the display area DA in FIG. 6, and the non-display area NDA2 corresponds to a non-display area on the right side of the display area DA in FIG. 6.

Figure 7:
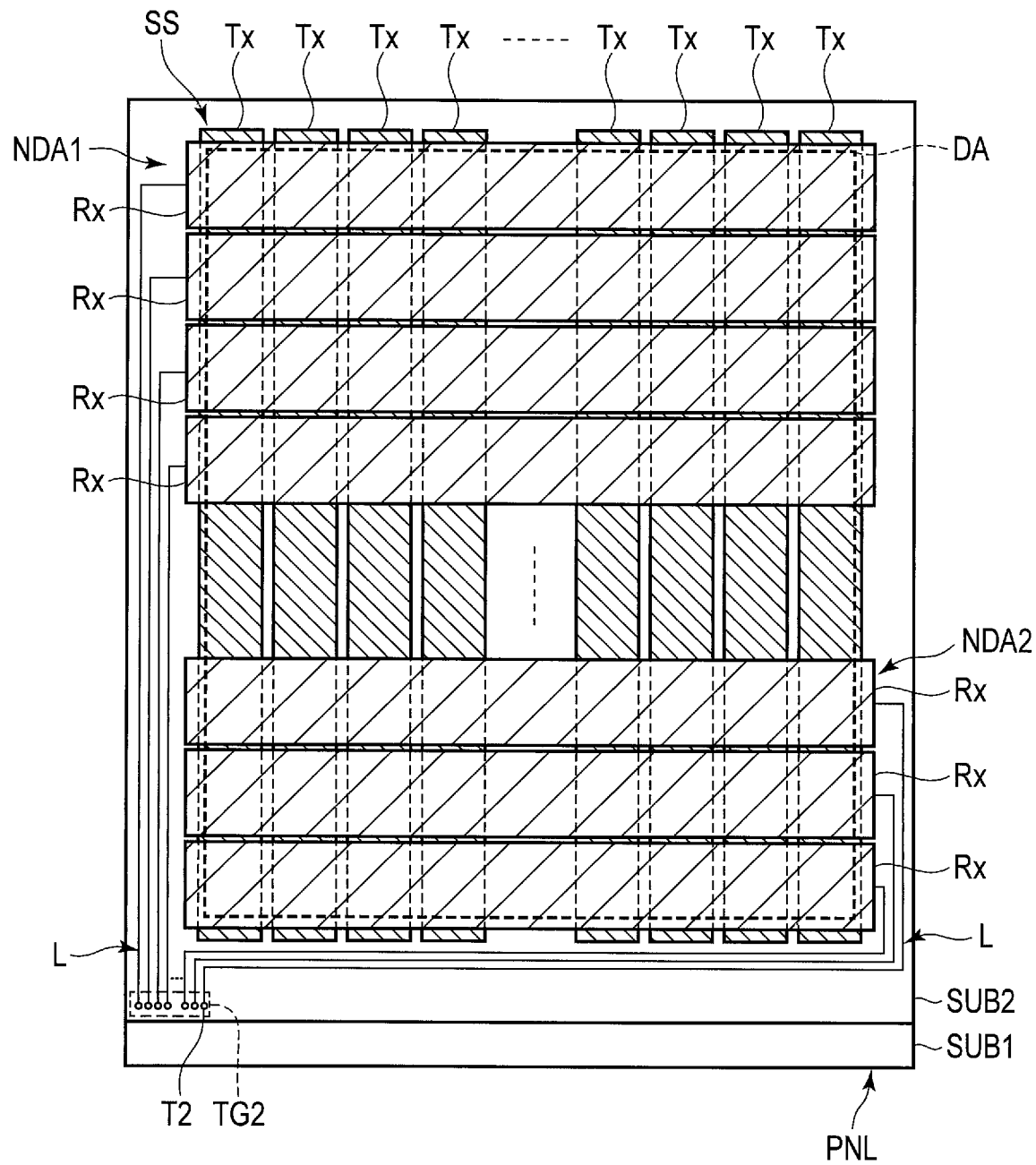
FIG. 7 is a plan view showing another configuration example of the sensor SS.

FIG. 7 is a plan view showing another configuration example of the sensor SS.

The example illustrated is different from the configuration example shown in FIG. 6 in the layout of the lead lines L. In the example illustrated, of the lead lines L, lead lines L connected to the detection electrodes Rx located on the upper half of the display area DA are located in the non-display area NDA1 on one side, and lead lines L connected to the detection electrodes Rx arranged on the lower half of the display area DA are located in the non-display area NDA2 on the other side.

Figure 8:
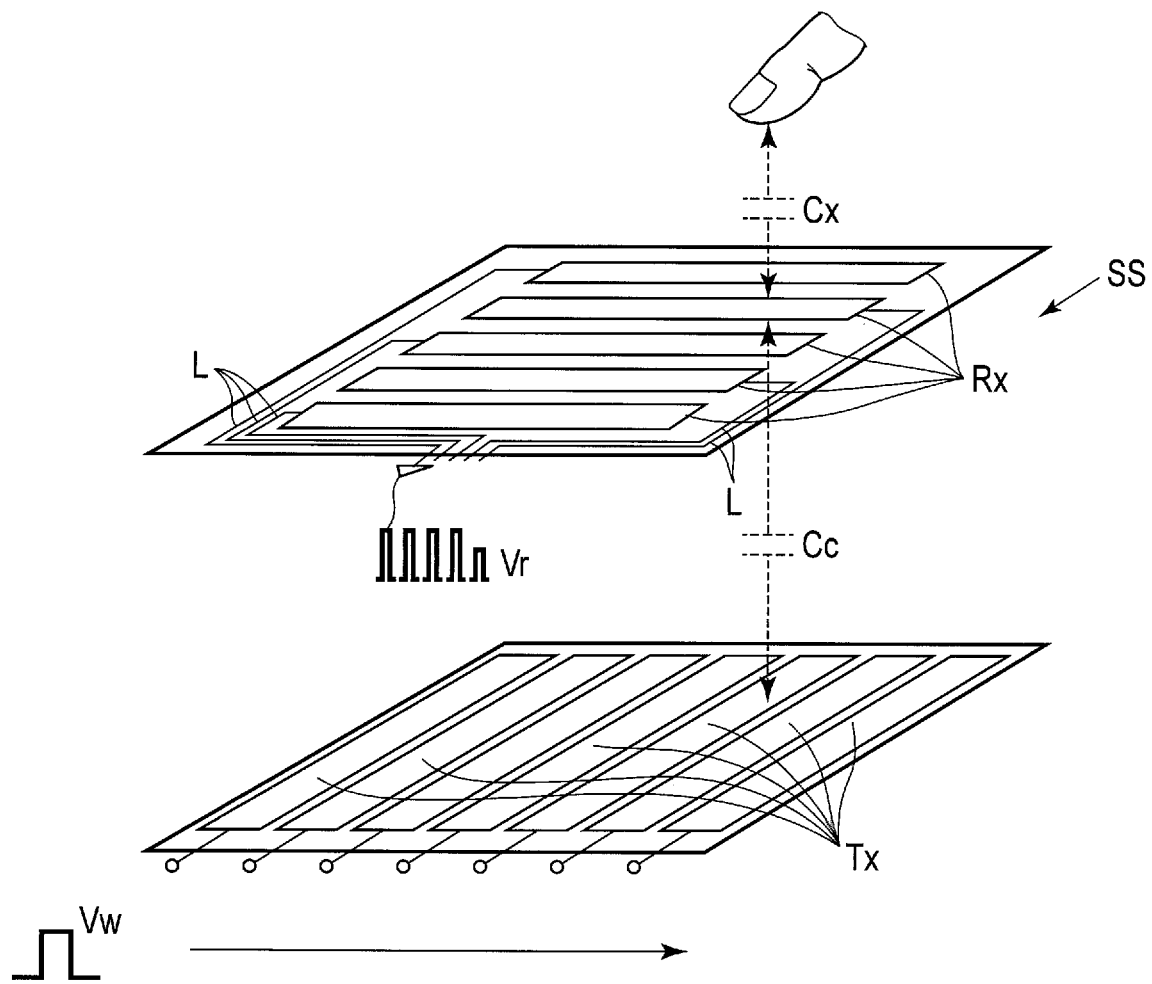
FIG. 8 is an illustration for describing an example of a sensing method.

Next, the principle of one example of a sensing method for detecting contact or approach of an object to be detected in the above-described display device DSP will be described referring to FIG. 8.

A capacitance Cc exists between the sensor driving electrode Tx and the detection electrode Rx. A pulse-like write signal (sensor drive signal) Vw is supplied to the sensor driving electrodes Tx, sequentially, in a predetermined cycle. In this example, it is assumed that the user's finger, which is the object to be detected, is present closely to a position where a specific detection electrode Rx and a specific sensor driving electrode Tx intersect each other. A capacitance Cx is produced by the object to be detected close to the detection electrode Rx. When the write signal Vw is supplied to the sensor driving electrode Tx, from the specific detection electrode Rx, a pulse-like read signal (sensor signal) Vr of a level lower than levels of pulses obtained from the other detection electrodes is obtained.

The detection circuit DC shown in FIG. 5 can detect two-dimensional position information on the object to be detected in the X-Y plane of the sensor SS, based on the timing when the write signal Vw is supplied to the sensor driving electrode Tx and the read signals Vr from the respective detection electrodes Rx. In addition, the capacitance Cx is different in cases where the object to be detected is close to the detection electrode Rx and the object to be detected is far from the detection electrode Rx. Accordingly, the level of the read signal Vr is also different in cases where the object to be detected is close to the detection electrode Rx and the object to be detected is far from the same. Therefore, in the detection circuit DC, based on the level of the read signal Vr, the proximity of the object to be detected to the sensor SS can also be detected.

Note that the sensor SS described above is not limited to a mutual-capacitive sensor which detects an object based on a change in the electrostatic capacitance between a pair of electrodes, but may be a self-capacitive sensor which detects an object based on a change in the electrostatic capacitance of the detection electrode Rx. Further, in the above example, the electrostatic capacitance corresponds to an electrostatic capacitance between the sensor driving electrode Tx and the detection electrode Rx.

Figure 9:
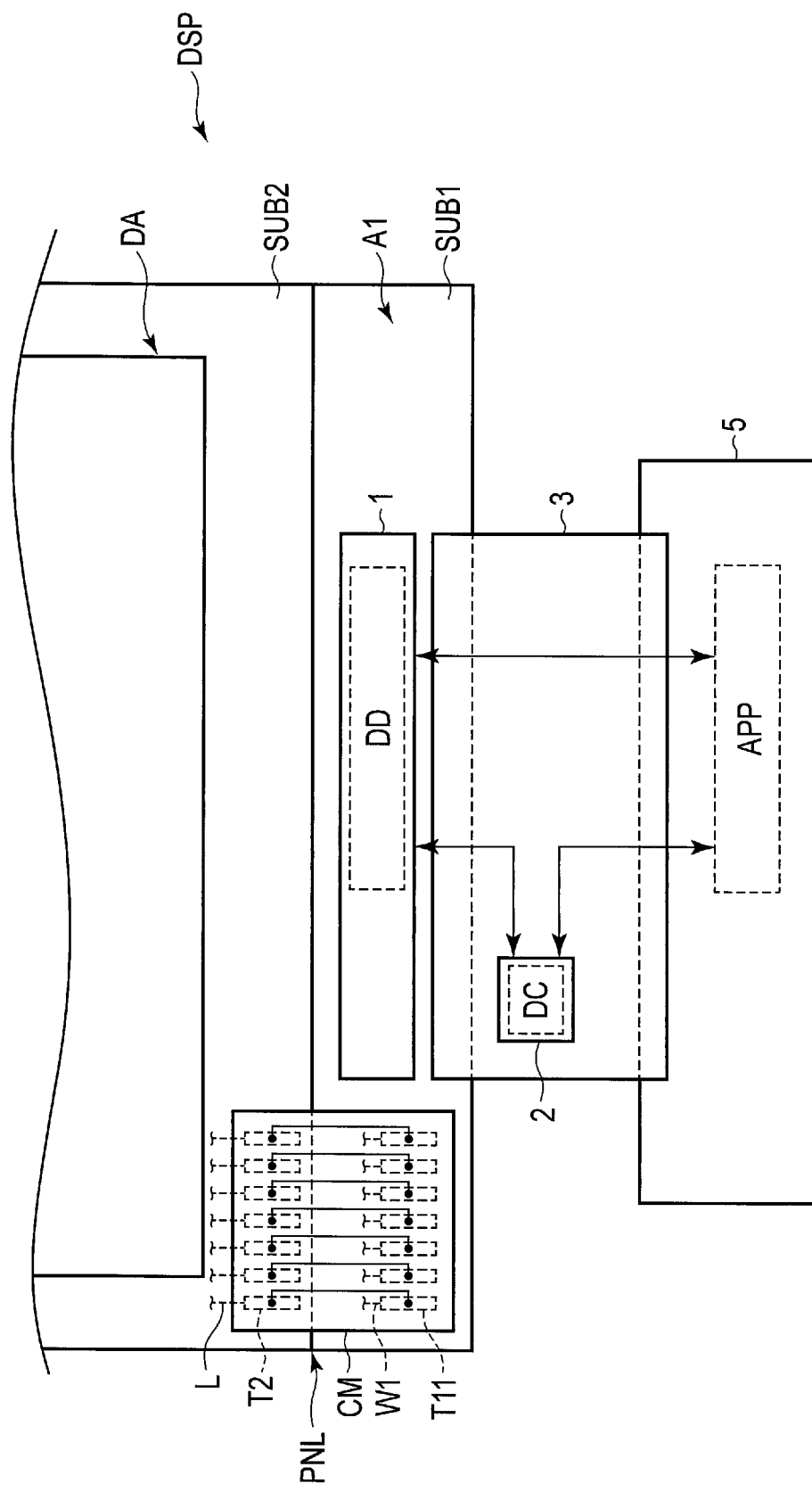
FIG. 9 is an illustration for explaining the relationship of connection in the display device DSP of the present embodiment.

FIG. 9 is an illustration for explaining the relationship of connection in the display device DSP of the present embodiment.

As illustrated in the drawing, the first substrate SUB1 comprises terminals (first terminals) T11 in the first area A1. The second substrate SUB2 comprises terminals (third terminals) T2. These terminals T11 and T2 are electrically connected to each other by a connecting member CM. In the planar view, the connecting member CM does not extend outside the display panel PNL, and is located more inwardly than the end portion of the first substrate SUB1 in the example illustrated. The structure of connection established by the connecting member CM will be described in detail later.

The terminal T2 is electrically connected to the detection electrode Rx via the lead line L, as shown in FIG. 6, etc. The terminal T11 is connected to a wiring W1. The wiring W1, which will be described in detail later, is electrically connected to the detection circuit DC.

The display device DSP of the illustrated example comprises the driving IC chip 1 in which the display driver DD is incorporated, an IC chip (a second IC chip or a second control unit) 2 in which the detection circuit DC is incorporated, and the flexible substrate 3. The driving IC chip 1 is connected to the first area A1. The IC chip 2 is connected to the flexible substrate 3. The external circuit board 5 comprises an application processor (a third control unit) APP, and is connected to the flexible substrate 3. A transmission path is formed between the application processor APP and the driving IC chip 1, between the application processor APP and the IC chip 2, and between the driving IC chip 1 and the IC chip 2. Thereby, the present embodiment is configured such that various signals can be exchanged between the application processor APP and the display driver DD, between the application processor APP and the detection circuit DC, and between the display driver DD and the detection circuit DC.

For example, at the display drive time, the application processor APP transmits various signals corresponding to graphic data, etc., to the display driver DD. The display driver DD supplies a scanning signal to the scanning line G at a predetermined timing, supplies a video signal to the signal line S, and a common drive signal to the sensor driving electrode Tx which serves as the common electrode CE, on the basis of the signal received from the application processor APP.

At the sensing drive time, one of the display driver DD and the detection circuit DC can generate a timing signal which informs a drive time of the sensor SS, and provide this timing signal to the other one of the display driver DD and the detection circuit DC. Alternatively, the application processor APP can provide a timing signal to the display driver DD and the detection circuit DC. By the above-mentioned timing signal, the display driver DD and the detection circuit DC can be synchronized. The display driver DD supplies a sensor drive signal to the sensor driving electrode Tx based on a control signal received from the application processor APP. The detection circuit DC reads a sensor signal output from the detection electrode Rx, generates a signal corresponding to a result of the sensing, and transmits the signal to the application processor APP. The application processor APP can perform various processes by using signals received from the display driver DD.

Figure 10:
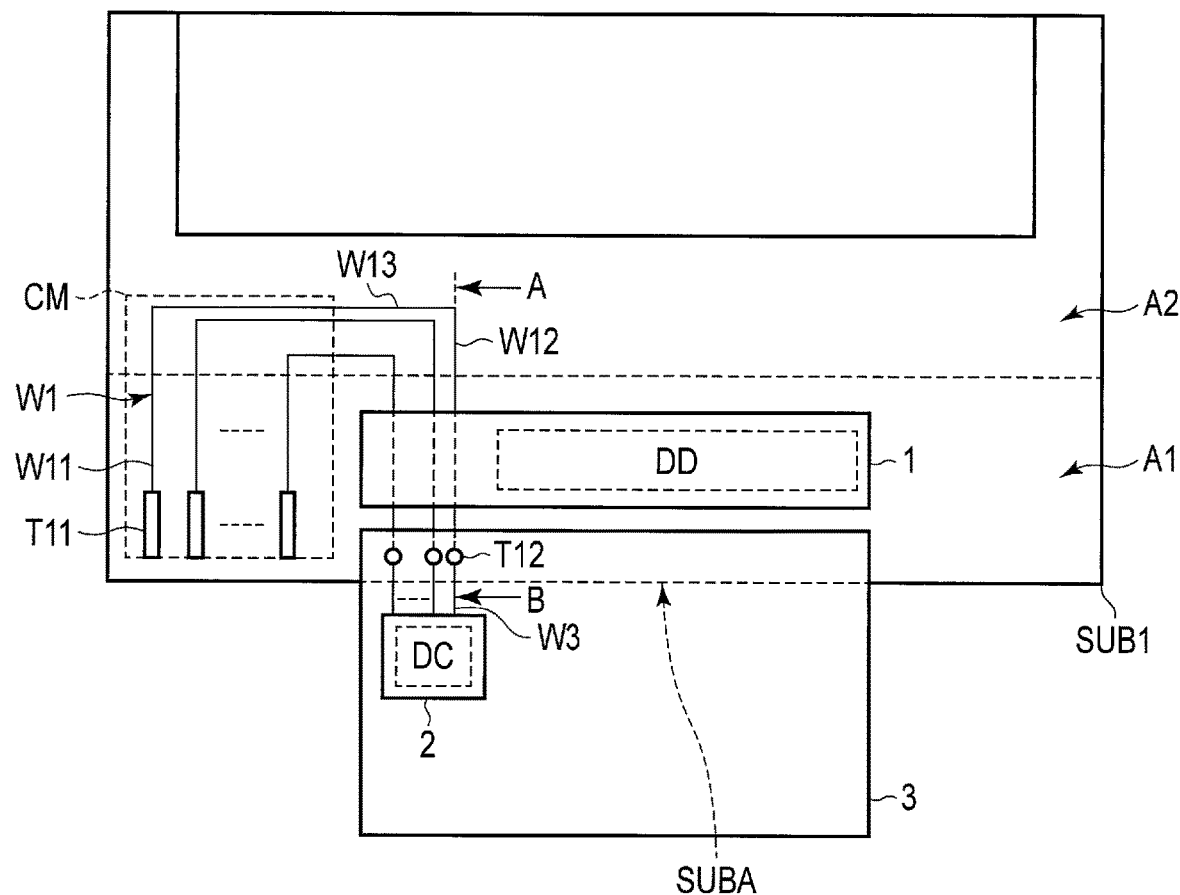
FIG. 10 is a plan view showing a configuration example of a first substrate SUB1 shown in FIG. 9.

FIG. 10 is a plan view showing a configuration example of the first substrate SUB1 illustrated in FIG. 9.

The first substrate SUB1 comprises the terminals (first terminals) T11 and terminals (second terminals) T12 located in the first area A1, and the wirings (first wirings) W1 connecting between the terminals T11 and the terminals T12, respectively. The terminals T12 are located closer to a substrate end SUBA of the first substrate SUB1 than the driving IC chip 1.

Each of the wirings W1 comprises a first portion W11, a second portion W12, and a third portion W13. The first portion W11 is located in the first area A1, is connected to the terminal T11, and is extended in such a way that it is directed toward the second area A2 from the terminal T11 without heading to the substrate end SUBA. The second portion W12 is located in the first area A1, is connected to the terminal T12, and is extended in such a way that it is directed toward the second area A2 from the terminal T12 without heading to the substrate end SUBA. In the example illustrated, the third portion W13 is located in the second area A2, and connects the first portion W11 and the second portion W12. The third portion W13 corresponds to a middle portion of the wiring W1. Note that in the example illustrated, middle portions of the wirings W1 connected to the respective terminals T11 are all located in the second area A2. However, there may be a case where the middle portion of only a part of the wirings W1 is located in the second area A2.

Also, in the example illustrated, a part of the second portion W12 of the wiring W1 is located under the driving IC chip 1. The flexible substrate 3 is connected to the terminals T12. The flexible substrate 3 comprises wirings W3 which connect the terminals T12 and the IC chip 2.

Figure 11:
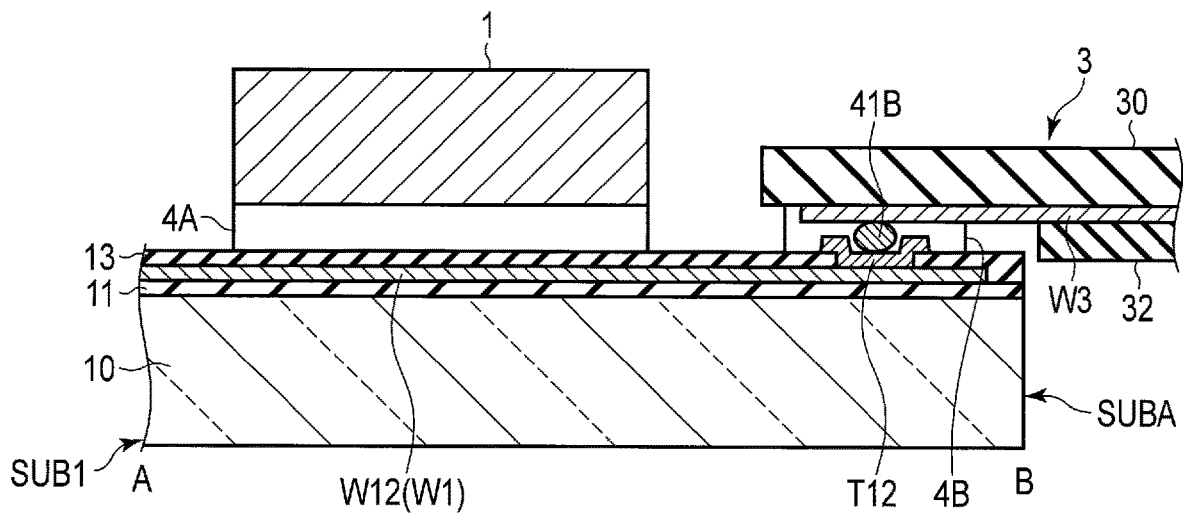
FIG. 11 is a cross-sectional view of the first substrate SUB1 taken along line A-B shown in FIG. 10.

FIG. 11 is a cross-sectional view of the first substrate SUB1 taken along line A-B shown in FIG. 10.

In the first substrate SUB1, the second portion W12 of the wiring W1 is located between, for example, the first insulating film 11 and the third insulating film 13, is arranged directly under the driving IC chip 1, and extends to a position close to the substrate end SUBA of the first substrate SUB1. Although such wiring W1 may be formed of the same metal material as the material of the signal line S1, etc., described referring to FIG. 4, for example, the wiring W1 may be formed of the same metal material as the material of the scanning lines, etc. The terminal T12 is located on the third insulating film 13, and contacts the second portion W12 via a contact hole which penetrates the third insulating film 13. Such terminal T12 may be formed of the same transparent conductive material as the one used for the pixel electrode PE, etc., described referring to FIG. 4, for example. Alternatively, an exposed portion of the wiring W1 which is exposed at a position where the third insulating film is penetrated may be employed as the terminal T12 without providing the terminal T12 separately from the wiring W1 as shown in the illustrated example.

The driving IC chip 1 and the flexible substrate 3 are connected to the first substrate SUB1 by conductive adhesive layers 4A and 4B, respectively. Each of the conductive adhesive layers 4A and 4B is, for example, an anisotropic conductive film in which conductive particles are dispersed in an adhesive. The flexible substrate 3 comprises a base layer 30, the wirings W3, a cover layer 32, and the like. The wirings W3 are located on the base layer 30 at the side opposed to the first substrate SUB1. The cover layer 32 covers the wirings W3. The wirings W3 are exposed from the cover layer 32 at a position where the cover layer 32 faces the terminals T12, and are electrically connected to the terminals T12 via conductive particles 41B of the conductive adhesive layer 4B. Although the driving IC chip 1 is adhered to the first substrate SUB1 at a position where the driving IC chip 1 overlaps the second portions W12 of the wirings W1, in the illustrated cross-section, the driving IC chip 1 is not electrically connected to the wirings W1.

According to the present embodiment, in the first substrate SUB1, the wiring W1 for electrically connecting the terminal T11, which is electrically connected to the detection electrode Rx of the second substrate SUB2 via the connecting member CM, and the detection circuit DC to each other, is extended in such a way that it is directed toward the second area A2 from the terminals T11 without heading to the substrate end SUBA. Accordingly, as compared to a case where the wiring W1 is extended toward the substrate end SUBA from the terminal T11, a width of the first area A1 along the second direction Y can be reduced, and a narrower frame structure can be achieved.

Also, with a structure in which the third portion W13 of the wiring W1 is located in the second area A2, an installation area of the wiring W1 in the first area A1 can be reduced, and the area of the first area A1 can be reduced. Accordingly, further narrowing of the frame is enabled.

Also, in a structure in which the detection circuit DC is incorporated in the IC chip 2 connected to the flexible substrate 3, the wirings W1 are arranged directly under the driving IC chip 1, and are extended to the terminals T12 to which the flexible substrate 3 is connected. Accordingly, as compared to a case where the wirings W1 are arranged in a route which detours around the driving IC chip 1, the length of each of the wirings W1 can be reduced, the installation area of the wirings W1 can further be reduced, and the interconnect resistance of the wirings W1 can also be reduced.

Also, in the planar view, the connecting member CM for connecting the first substrate SUB1 and the second substrate SUB2 does not protrude from the display panel PNL, and only the flexible substrate 3 connected to the first substrate SUB1 protrudes from the display panel PNL and is connected to the external circuit board 5. Accordingly, as compared to a case where the first substrate SUB1 and the second substrate SUB2 are connected to the circuit board 5 via different flexible substrates, respectively, the number of flexible substrates can be reduced, and not only the structure can be simplified, but the cost can be reduced.

Also, since the flexible substrate 3 is unified, a connector for electrically connecting a plurality of flexible substrates to each other becomes unnecessary, whereby the display device can be made small and thin.

Furthermore, when the display device DSP to which the flexible substrate 3 is connected is set in an electronic apparatus, a component within the electronic apparatus and the flexible substrate 3 can be prevented from being in contact with each other, and thus, the construct can be installed at a desired position.

Next, another configuration example will be described.

FIG. 12 is a plan view showing another configuration example of the first substrate SUB1 illustrated in FIG. 9.

The configuration example illustrated is different from the configuration example shown in FIG. 10 in the structure of the first area A1 in the first substrate SUB1. That is, the first substrate SUB1 comprises, in the first area A1, terminals (fourth terminals) T13, terminals (fifth terminals) T14, and wirings (second wirings) W2 connecting between the terminals T13 and the terminals T14, respectively, in addition to the terminals (first terminals) T11 and terminals (second terminals) T12. The terminals T12 and the terminals T13 are located directly under the driving IC chip 1. The terminals T12 and terminals T13 are arranged along the respective long sides of the driving IC chip 1. The terminals T14 are located closer to the substrate end SUBA of the first substrate SUB1 than the driving IC chip 1. In the first substrate SUB1, the terminals T13 and T14 are electrically connected.

The driving IC chip 1 is connected to the terminals T12 and T13. Also, the driving IC chip 1 electrically connects the terminals T12 and T13 inside the driving IC chip 1. The flexible substrate 3 is connected to the terminals T14. The flexible substrate 3 comprises wirings W3 which connect the terminals T14 and the IC chip 2. Note that the wirings W1 which connect between the terminals T11 and terminals T12 are structured similarly to the configuration example illustrated in FIG. 10, and detailed explanation thereof is omitted. Here, the first portion W11 is extended from the terminal T11 toward the second area A2, and the third portion W13 is located in the second area A2.

FIG. 13 is a cross-sectional view of the first substrate SUB1 taken along line C-D shown in FIG. 12.

In the first substrate SUB1, the second portion W12 of the wiring W1 and the wiring W2 are located between, for example, the first insulating film 11 and the third insulating film 13. The second portion W12 extends directly under the driving IC chip 1. The wiring W2 is separated from the second portion W12, is arranged directly under the driving IC chip 1, and extends to a position close to the substrate end SUBA. Each of the terminals T12 and T14 is located on the third insulating film 13. The terminal T12 is in contact with the second portion W12. Each of the terminals T13 and T14 is in contact with the wiring W2.

Terminals T22 and T23 of the driving IC chip 1 are electrically connected to the terminals T12 and T13 by conductive particles 42A and 43A of the conductive adhesive layer 4A, respectively. The flexible substrate 3 is electrically connected to the terminals T14 by the conductive particles 41B of the conductive adhesive layer 4B.

Also in the configuration example shown in FIGS. 12 and 13, the same advantages as those of the above configuration example can be obtained.

Figure 14:
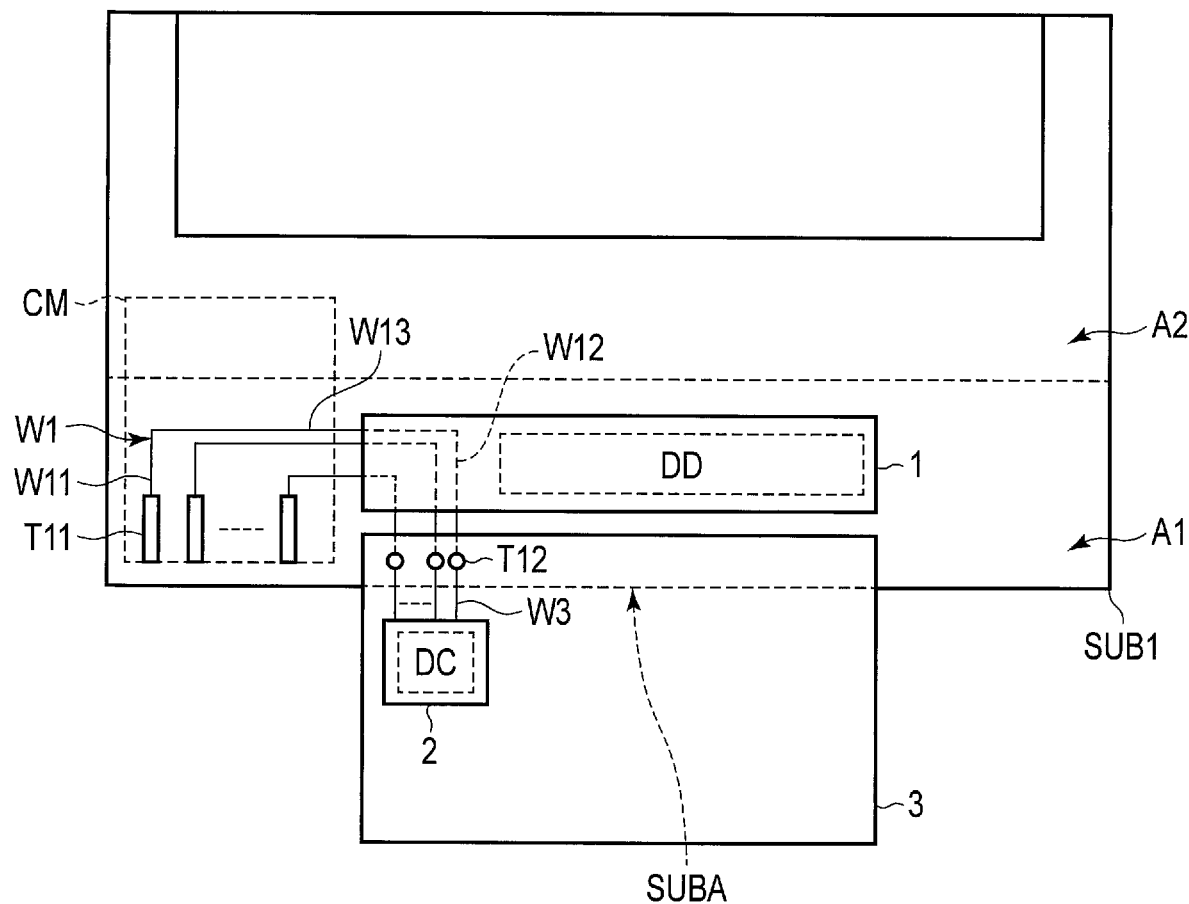
FIG. 14 is a plan view showing yet another configuration example of the first substrate SUB1 shown in FIG. 9.

FIG. 14 is a plan view showing yet another configuration example of the first substrate SUB1 illustrated in FIG. 9.

The configuration example illustrated is different from the configuration example shown in FIG. 10 in that the first wirings W1 are entirely located in the first area A1. That is, with respect to each of the wirings W1, the first portion W11, the second portion W12, and the third portion W13 are all located in the first area A1. More specifically, while the first portion W11 is extended toward the second area A2 from the terminal T11, the first portion W11 is connected to the third portion W13 without reaching the second area A2. Similarly, while the second portion W12 is extended toward the second area A2 from the terminal T12, the second portion W12 is connected to the third portion W13 without reaching the second area A2. The third portion W13 connects between the first portion W11 and the second portion W12 in the first area A1.

Also, in the example illustrated, a joint part of the second portion W12 and the third portion W13 in the wiring W1 is located below the driving IC chip 1.

Also in this configuration example, the same advantages as those of the above configuration example can be obtained. In addition, since all parts of the wirings W1 are located in the first area A1, the scanning lines and signal lines located in the second area A2 can easily be arranged without considering the layout of the wirings W1.

FIG. 15 is a plan view showing yet another configuration example of the first substrate SUB1 illustrated in FIG. 9.

The configuration example illustrated is different from the configuration example shown in FIG. 14 in the structure of the first area A1 in the first substrate SUB1. That is, as in the configuration example illustrated in FIG. 12, the first substrate SUB1 comprises, in the first area A1, the terminals T13, the terminals T14, and the wirings W2 connecting between the terminals T13 and the terminals T14, respectively, in addition to the terminals T11 and the terminals T12. The terminals T12 and the terminals T13 are located directly under the driving IC chip 1. The terminals T12 are arranged along a short side 1S of the driving IC chip 1, and the terminals T13 are arranged along a long side 1L of the driving IC chip 1. The short side is adjacent to the connecting member CM. The long side 1L is adjacent to the flexible substrate 3. The terminals T14 are located closer to the substrate end SUBA of the first substrate SUB1 than the driving IC chip 1.

As in the case of FIG. 13, the driving IC chip 1 includes the terminals T22 and T23 at positions corresponding to the terminals T12 and T13, respectively, and by electrically connecting the terminals T22 and T23 to each other in the driving IC chip 1, the terminals 12 and 13 are electrically connected. The flexible substrate 3 is connected to the terminals T14. Note that the wirings W1 which connect between the terminals T11 and the terminals T12 are structured similarly to the configuration example illustrated in FIG. 14, and thus, detailed explanation thereof is omitted. Here, the wirings W1 are entirely located in the first area A1.

Also in the configuration example shown in FIG. 15, the same advantages as those of the configuration example shown in FIG. 14 can be obtained.

Figure 16:
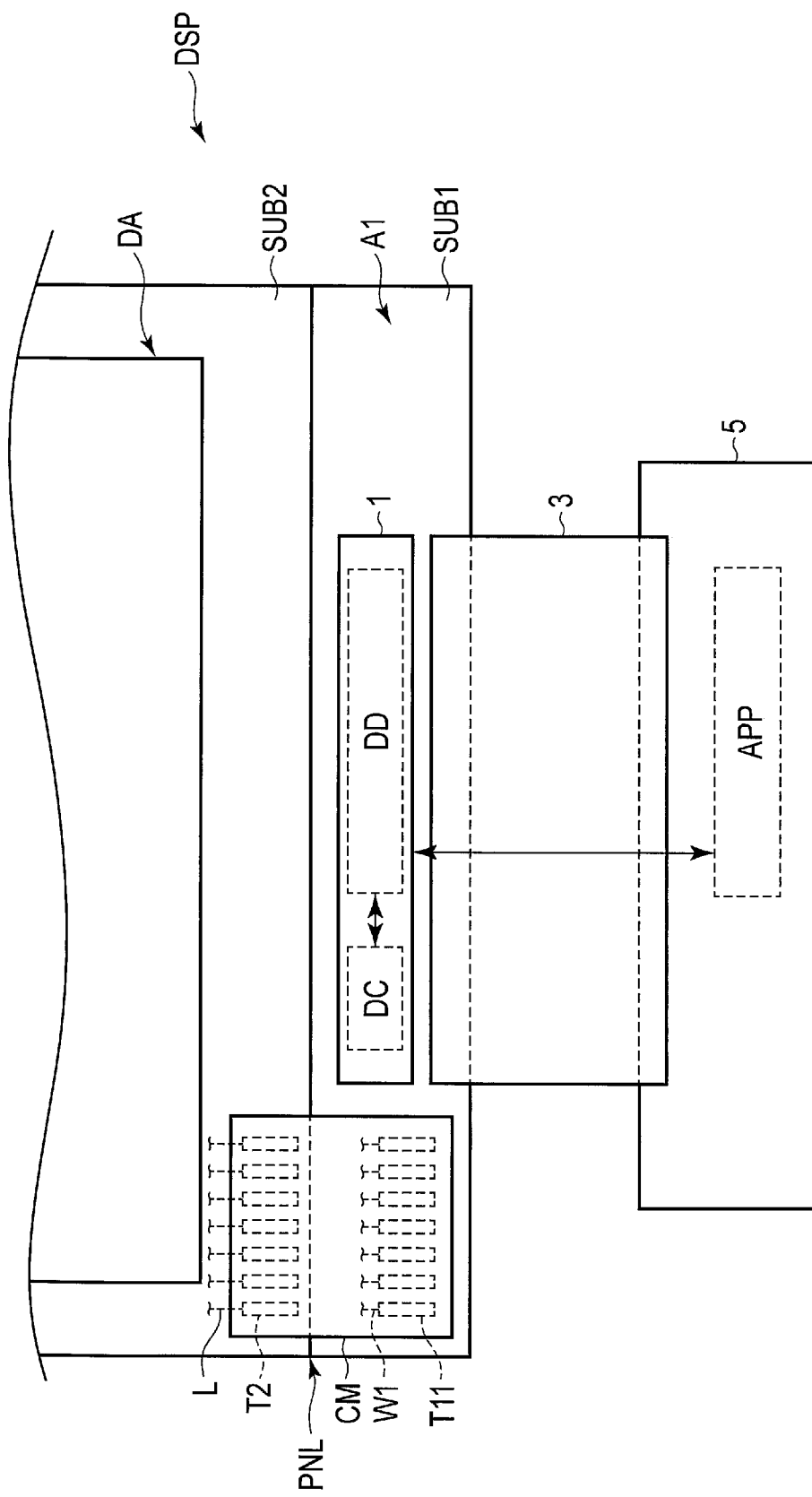
FIG. 16 is an illustration for explaining another configuration example of the display device DSP.

FIG. 16 is an illustration for explaining another configuration example of the display device DSP.

The configuration example illustrated is different from the configuration example shown in FIG. 9 in that the driving IC chip (first IC chip) 1 includes the detection circuit DC as well as the display driver DD therein. A transmission path is formed between the application processor APP of the circuit board 5 and the driving IC chip 1. Thereby, the display device DSP is configured such that various signals can be exchanged between the application processor APP and the display driver DD and between the application processor APP and the detection circuit DC. Also, the driving IC chip 1 is configured such that various signals can be exchanged between the display driver DD and the detection circuit DC.

Figure 17:
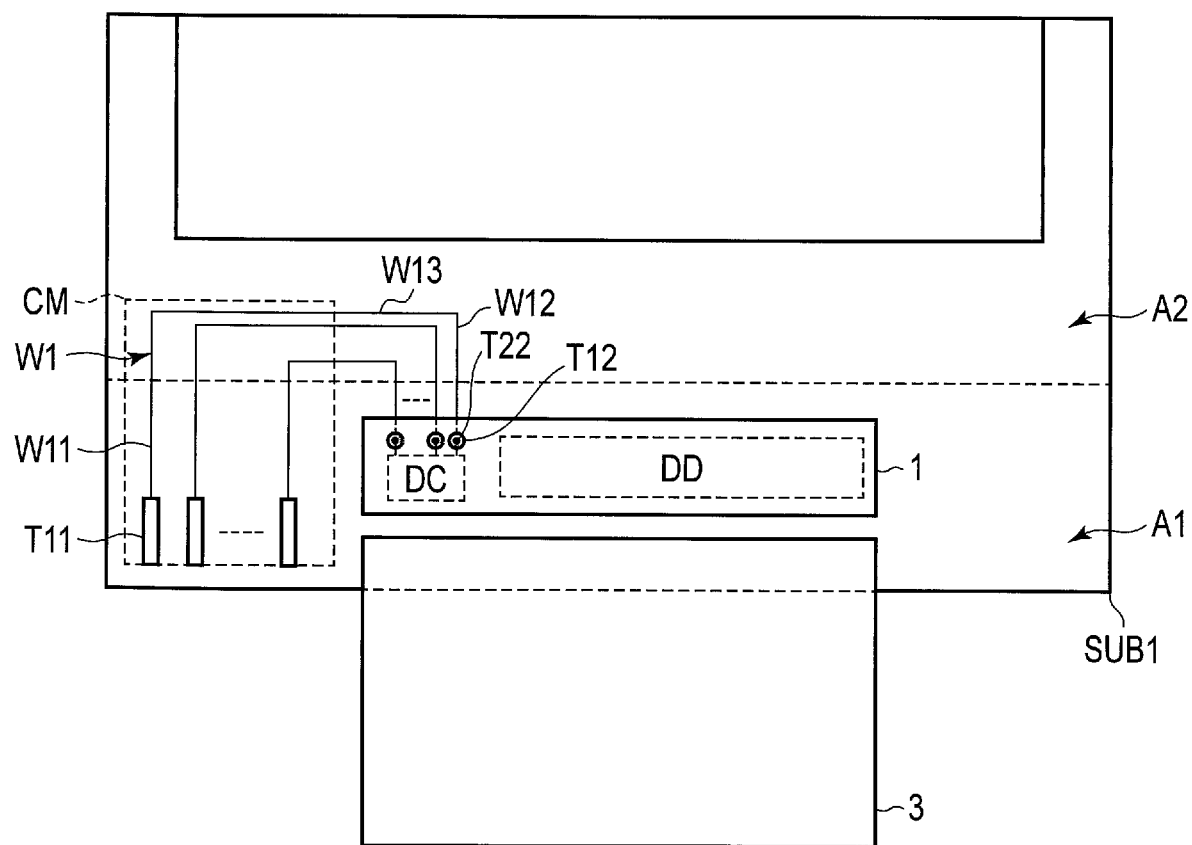
FIG. 17 is a plan view showing a configuration example of the first substrate SUB1 shown in FIG. 16.

FIG. 17 is a plan view showing a configuration example of the first substrate SUB1 illustrated in FIG. 16.

The first substrate SUB1 comprises the terminals T11 and the terminals T12 located in the first area A1, and the wirings W1 connecting between the terminals T11 and the terminals T12, respectively. The terminals T12 are located directly under the driving IC chip 1, and are arranged along a long side of the driving IC chip 1.

In each of the wirings W1, the first portion W11 is extended from the terminal T11 of the first area A1 toward the second area A2. The second portion W12 is extended from the terminal T12 of the first area A1 toward the second area A2. The third portion W13 is located in the second area A2, and connects between the first portion W11 and the second portion W12. The driving IC chip 1 is connected to the terminals T12.

As in the case of FIG. 13, the driving IC chip 1 includes the terminals T22 at positions corresponding to the terminals T12, and the terminals T12 and the terminals T22 are electrically connected. The terminals T22 and the detection circuit DC are electrically connected within the driving IC chip 1, and transmit and receive signals.

Also in this configuration example, the same advantages as those of the above configuration example can be obtained. In addition, since the IC chip 2 is omitted, and the detection circuit DC is incorporated in the driving IC chip 1, the flexible substrate 3 can be made small and thin.

Figure 18:
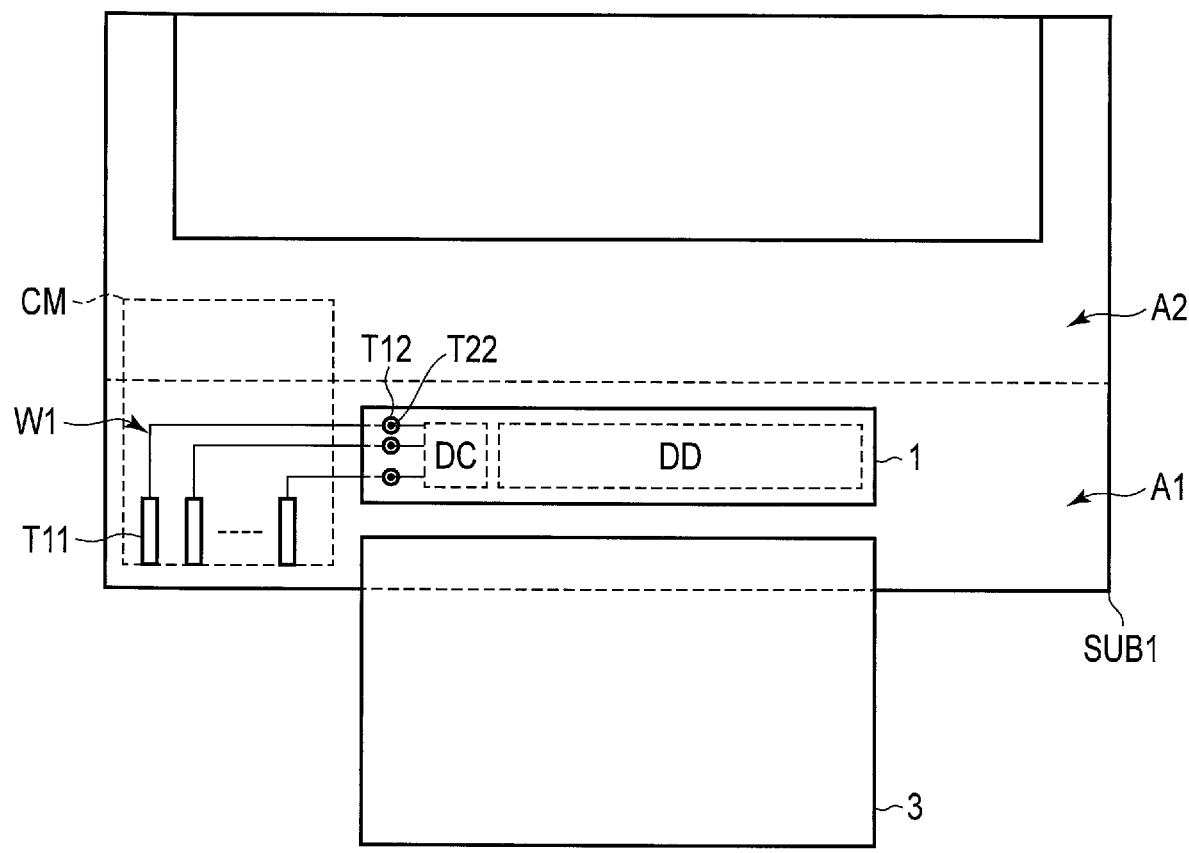
FIG. 18 is a plan view showing another configuration example of the first substrate SUB1 shown in FIG. 16.

FIG. 18 is a plan view showing another configuration example of the first substrate SUB1 illustrated in FIG. 16.

The configuration example illustrated is different from the configuration example shown in FIG. 17 in that the wirings W1 connecting between the terminals T11 and T12 are entirely located in the first area A1. The terminals T12 are located directly under the driving IC chip 1, and are arranged along a short side of the driving IC chip 1.

As in the case of FIG. 13, the driving IC chip 1 includes the terminals T22 at positions corresponding to the terminals T12, and the terminals T12 and the terminals T22 are electrically connected. The terminals T22 and the terminals T12 are electrically connected in the driving IC chip 1. The terminals T22 and the detection circuit DC are electrically connected in the driving IC chip 1.

Also in the configuration example shown in FIG. 18, the same advantages as those of the configuration example shown in FIG. 17 can be obtained.

FIG. 19A corresponds to, for example, FIGS. 10, 12, and 17, and is a cross-sectional view showing a configuration example of the connecting member CM applicable to the present embodiment.

The configuration example illustrated corresponds to a case where the connecting member CM is a flexible printed circuit 7.

In FIG. 19A, in the first substrate SUB1, the first portion W11 of the wiring W1 is located between, for example, the first insulating film 11 and the third insulating film 13, extends from the terminal T11 to the second area, and is connected to the third portion W13 within the second area. The terminal T11 is located above the third insulating film 13, and is in contact with the first portion W11 through a contact hole which penetrates the third insulating film 13.

In the second substrate SUB2, the lead lines L and the terminals T2 are located on the outer surface SBA of the second substrate SUB2.

The flexible printed circuit 7 comprises a base layer 70, a conductive layer 71, and a cover layer 72. The conductive layer 71 is located on the base layer 70 at the side opposed to the display panel PNL, and is extended from a position opposed to the first substrate SUB1 to a position opposed to the second substrate SUB2. The cover layer 72 covers the conductive layer 71. The conductive layer 71 is exposed from the cover layer 72 at a position opposed to the terminals T11, and is electrically connected to the terminals T11 via conductive particles 44C of a conductive adhesive layer 4C. Also, the conductive layer 71 is exposed from the cover layer 72 at a position opposed to the terminals T2, and are electrically connected to the terminals T2 via conductive particles 45D of a conductive adhesive layer 4D. In this way, the terminals T11 and T12 are electrically connected to each other via the conductive layer 71 of the flexible printed circuit 7. Note that the conductive adhesive layers 4C and 4D are both an anisotropic conductive film, for example. The flexible printed circuit 7 is connected to each of the first substrate SUB1 and the second substrate SUB2 by a method such as thermocompression bonding.

FIG. 19B corresponds to, for example, FIGS. 14, 15, and 18, and is a cross-sectional view showing another configuration example of the connecting member CM applicable to the present embodiment. In FIG. 19B, in the first substrate SUB1, the first portion W11 of the wiring W1 is located between, for example, the first insulating film 11 and the third insulating film 13, and is connected to the third portion W13 within the first area. The other structures are the same as those of FIG. 19A.

FIG. 20A corresponds to, for example, FIGS. 10, 12, and 17, and is a cross-sectional view showing yet another configuration example of the connecting member CM applicable to the present embodiment.

The configuration example illustrated corresponds to a case where the connecting member CM is a conductive paste 8. In the first area A1 of the first substrate SUB1, a fillet 81 for moderating a difference in level between the first substrate SUB1 and the second substrate SUB2 is arranged. The conductive paste 8 is formed by, for example, dispersing conductive material such as silver into a resin material. The conductive paste 8 is arranged on each of the terminals T11, an inclined surface of the fillet 81, and the terminals T2, and the respective portions of the conductive paste 8 are connected to each other. In this way, the terminals T11 and the terminals T2 are electrically connected to each other via the conductive paste 8. Such conductive paste 8 is obtained by performing a hardening treatment by ultraviolet irradiation or heating after a conductive paste has been applied by using, for example, a dispenser or a screen printing plate. In FIG. 20A, in the first substrate SUB1, the first portion W11 of the wiring W1 is located between, for example, the first insulating film 11 and the third insulating film 13, extends from the terminal T11 to the second area, and is connected to the third portion W13 within the second area.

FIG. 20B corresponds to, for example, FIGS. 14, 15, and 18, and is a cross-sectional view showing yet another configuration example of the connecting member CM applicable to the present embodiment. In FIG. 20B, in the first substrate SUB1, the first portion W11 of the wiring W1 is located between, for example, the first insulating film 11 and the third insulating film 13, and is connected to the third portion W13 within the first area. The other structures are the same as those of FIG. 20A.

FIG. 21A corresponds to, for example, FIGS. 10, 12, and 17, and is a cross-sectional view showing yet another configuration example of the connecting member CM applicable to the present embodiment.

The configuration example illustrated corresponds to a case where the connecting member CM is a wire 9. The wire 9 is connected to each of the terminal T11 and the terminal T2. In this way, the terminal T11 and the terminal T2 are electrically connected to each other via the wire 9. The wire 9 as described above is connected by a method such as wire bonding. In FIG. 21A, in the first substrate SUB1, the first portion W11 of the wiring W1 is located between, for example, the first insulating film 11 and the third insulating film 13, extends from the terminal T11 to the second area, and is connected to the third portion W13 within the second area.

FIG. 21B corresponds to, for example, FIGS. 14, 15, and 18, and is a cross-sectional view showing yet another configuration example of the connecting member CM applicable to the present embodiment. In FIG. 21B, in the first substrate SUB1, the first portion W11 of the wiring W1 is located between, for example, the first insulating film 11 and the third insulating film 13, and is connected to the third portion W13 within the first area. The other structures are the same as those of FIG. 20A.

Figure 22:
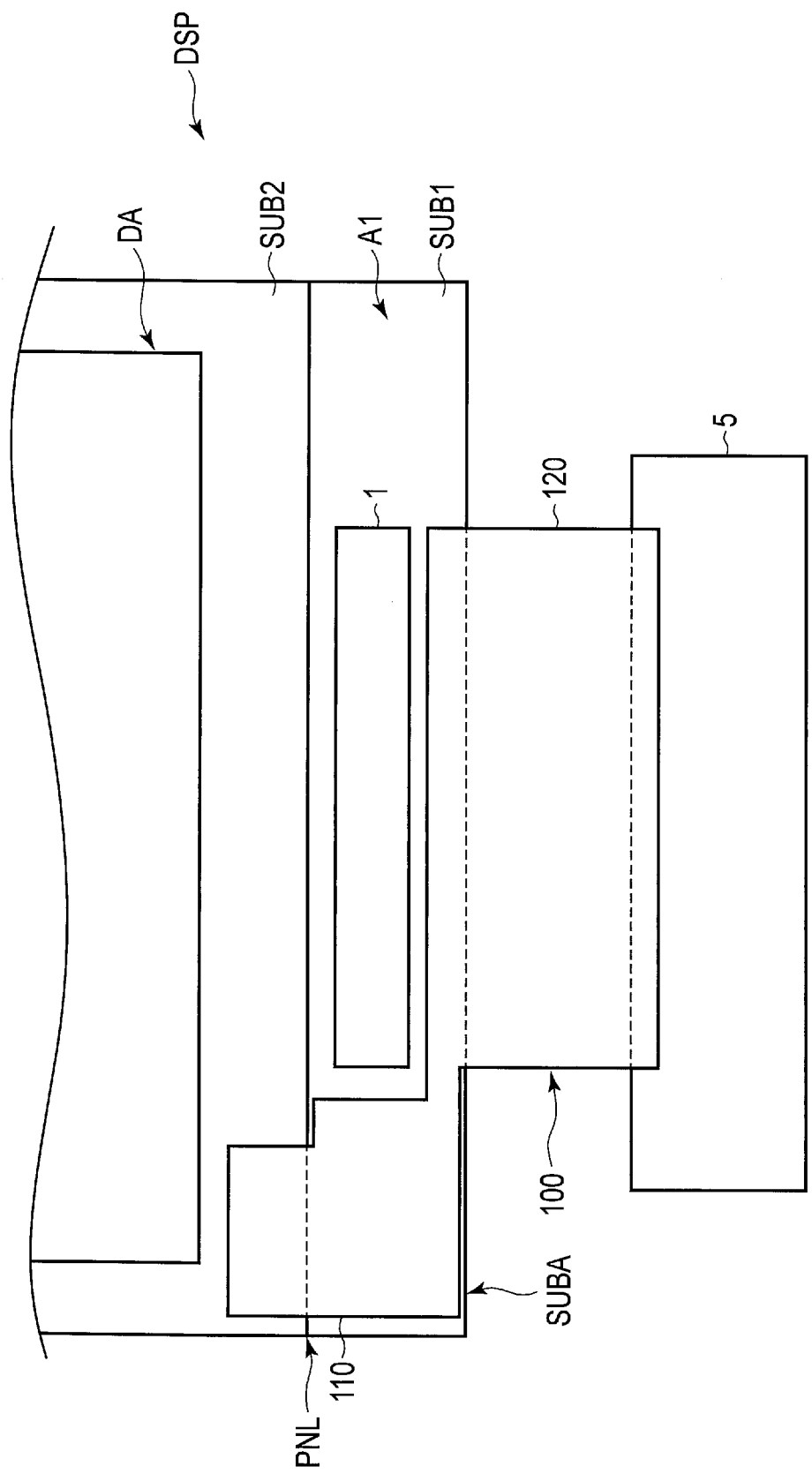
FIG. 22 is an illustration for explaining yet another configuration example of the display device DSP.

FIG. 22 is an illustration for explaining yet another configuration example of the display device DSP.

The configuration example illustrated is different from the above-described configuration examples in that a single flexible substrate 100 having the functions of both the connecting member CM and the flexible substrate 3 is provided. That is, the flexible substrate 100 includes a first portion 110 for connecting the first substrate SUB1 and the second substrate SUB2, and a second portion 120 for connecting the first substrate SUB1 and the external circuit board 5. As has been described referring to FIG. 9, the first portion 110 connects the terminals T11 of the first substrate SUB1 and the terminals T2 of the second substrate SUB2. In the planar view, the first portion 110 does not extend outside the display panel PNL or the first substrate SUB1, and is located more inwardly than the substrate end SUBA of the first substrate SUB1 in the example illustrated.

Figure 23:
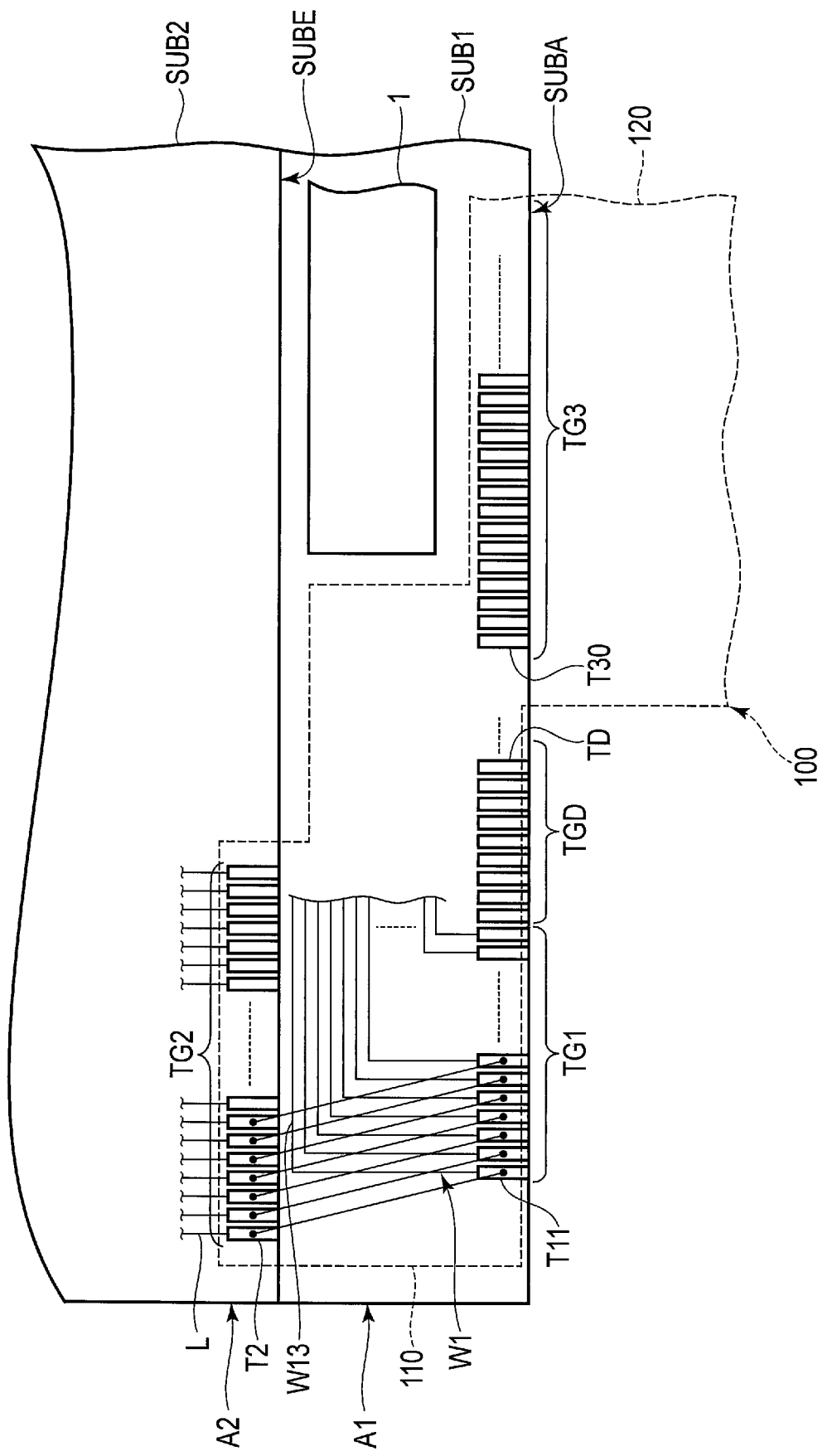
FIG. 23 is a plan view which shows parts of a first substrate SUB1 and a second substrate SUB2 shown in FIG. 22 in an enlarged scale.

FIG. 23 is a plan view which shows parts of the first substrate SUB1 and the second substrate SUB2 shown in FIG. 22 in an enlarged scale. Note that in the drawing, the flexible substrate 100 is depicted by a dotted line.

The first substrate SUB1 comprises, in the first area A1, a terminal group TG1 including a plurality of terminals T11, a terminal group TGD including a plurality of dummy terminals TD, and a terminal group TG3 including a plurality of terminals T30. Note that the dummy terminals TD are provided as necessary, and the number of dummy terminals TD is arbitrary. In other word, the dummy terminals TD may be omitted. The terminals T11, the dummy terminals TD, and the terminals T30 are located on the same straight line along the substrate end SUBA of the first substrate SUB1.

The second substrate SUB2 comprises the terminal group TG2 including a plurality of terminals T2. Note that the second substrate SUB2 may comprise dummy terminals other than the terminals T2 as necessary. The terminals T2 are located on the same straight line along a substrate end SUBE of the second substrate SUB2.

The terminals T11 are electrically connected to the terminals T2 by the first portion 110 of the flexible substrate 100. As regards the structure of connection between the terminals T11 and T2, the configuration example explained with reference to FIG. 19 is applicable. The terminals T11 are connected to the wirings W1, respectively. The wirings W1 are extended toward the second area A2. In the example illustrated, as has been described referring to FIG. 14, etc., the third portion W13 (a middle portion) of each of the wirings W1 is located in the first area A1. Note that the middle portion of each of the wirings W1 may be located in the second area A2, as has been explained referring to FIG. 10, etc. End portions of the respective wirings W1 may be connected to the terminal T30, as in the case of FIG. 10, etc., or may be connected to terminals which are connected to the driving IC chip 1, as in the case of FIG. 12, etc.

The terminals T30 are mainly terminals which are electrically connected to the driving IC chip 1, and may in some cases include terminals which are electrically connected to the terminals T11, as described above.

In such a configuration example, the first portion 110 of the flexible substrate 100 connects the respective terminals T11 of the terminal group TG1 and the respective terminals T2 of the terminal group TG2, and the second portion 120 of the flexible substrate 100 is connected to the respective terminals T30 of the terminal group TG3. According to such a configuration example, as compared to a case where the connecting member CM and the flexible substrate 3 are provided separately, the first portion 110 and the second portion 120 of the flexible substrate 100 can be connected by a mounting process carried out once, and a manufacturing process can be simplified.

As described above, according to the present embodiment, a narrow-framed sensor-equipped display device can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor-equipped display device comprising:
a first substrate comprising a first area and a second area adjacent to the first area, the first substrate comprising a first terminal and a second terminal which are located in the first area, and a first wiring which electrically connects the first terminal and the second terminal;
a second substrate opposed to the second area, the second substrate comprising a detection electrode which outputs a sensor signal necessary for sensing, and a third terminal electrically connected to the detection electrode;
a connecting member which electrically connects the first terminal and the third terminal; and
a detection circuit which is electrically connected to the first wiring, and reads the sensor signal output from the detection electrode,
at least a part of the first wiring being extended from the first terminal toward the second area, wherein
the first area is an area in which the second substrate does not overlap the first substrate,
the second area is an area in which the first substrate and the second substrate overlap each other,
the connecting member is electrically connected to the first substrate in the first area and is electrically connected to the second substrate in the second area,
the connecting member does not extend outside the first substrate in a planar view,
the first substrate has a first surface opposed to the second substrate,
the first surface extends in the first area and the second area,
the first terminal is located on the first surface of the first area,
the second substrate has a second surface opposed to the first substrate and a third surface on an opposite side to the second surface,
the third terminal is located on the third surface,
the connecting member is a flexible printed circuit board and includes a base layer and a conductive layer provided on an undersurface of the base layer, and the undersurface is opposed to the first surface and the third surface, and
the conductive layer electrically connects the first terminal and the third terminal.

2. The sensor-equipped display device of claim 1, wherein the first wiring is partly located in the second area.

3. The sensor-equipped display device of claim 1, wherein the first wiring is entirely located in the first area.

4. The sensor-equipped display device of claim 1, further comprising a first IC chip including the detection circuit, wherein
the first IC chip is connected to the second terminal.

5. The sensor-equipped display device of claim 1, further comprising a flexible substrate, a first IC chip, and a second IC chip, wherein
the second IC chip includes the detection circuit and is connected to the flexible substrate.

6. The sensor-equipped display device of claim 5, wherein:
the first wiring is partly located under the first IC chip in the first area; and
the flexible substrate is connected to the second terminal.

7. The sensor-equipped display device of claim 5, wherein:
the first substrate further comprises, in the first area, a fourth terminal, a fifth terminal, and a second wiring which electrically connects the fourth terminal and the fifth terminal;
the first IC chip is connected to each of the second terminal and the fourth terminal, and electrically connects the second terminal and the fourth terminal therein; and
the flexible substrate is connected to the fifth terminal.

8. The sensor-equipped display device of claim 1, wherein the connecting member is one of a flexible printed circuit board, a conductive paste, and a wire.

9. The sensor-equipped display device of claim 1, wherein the second substrate further comprises a lead line which connects between the detection electrode and the third terminal, and the lead line is formed of a metal material.

10. The sensor-equipped display device of claim 1, wherein:
the first substrate further comprises, in the second area, a scanning line extending in a first direction, a signal line extending in a second direction intersecting the first direction, and a sensor driving electrode extending in the first direction or the second direction; and
the detection electrode extends in a direction intersecting the sensor driving electrode.

11. The sensor-equipped display device of claim 1, wherein:
the connecting member is a flexible substrate; and the flexible substrate includes a first portion which electrically connects the first terminal and the third terminal, and a second portion which connects the first substrate and an external circuit board.

12. The sensor-equipped display device of claim 11, wherein the first portion is located more inwardly than a substrate end of the first substrate in a planar view.

13. A sensor-equipped display device comprising:
a first substrate comprising a first area and a second area adjacent to the first area, the first substrate comprising first and second terminals located in the first area, and a first wiring which electrically connects the first terminal and the second terminal;
a second substrate opposed to the second area, the second substrate comprising a detection electrode which outputs a sensor signal necessary for sensing, and a third terminal electrically connected to the detection electrode;
a connecting member which electrically connects the first terminal and the third terminal; and
a detection circuit electrically connected to the first wiring, wherein
the first area is an area in which the second substrate does not overlap the first substrate,
the second area is an area in which the first substrate and the second substrate overlap each other,
the connecting member is electrically connected to the first substrate in the first area and is electrically connected to the second substrate in the second area,
the connecting member does not extend outside the first substrate in a planar view,
the first wiring includes a first portion which is connected to the first terminal and is extended toward the second area, a second portion which is connected to the second terminal and is extended toward the second area, and a third portion which connects the first portion and the second portion, and
the third portion of the first wiring is located under the second substrate in the second area of the first substrate.

14. The sensor-equipped display device of claim 13, wherein the first to third portions are located in the first area.

15. The sensor-equipped display device of claim 13, further comprising a first IC chip including the detection circuit, wherein
the first IC chip is connected to the second terminal.

16. The sensor-equipped display device of claim 13, further comprising a flexible substrate, a first IC chip, and a second IC chip, wherein:
the second IC chip includes the detection circuit and is connected to the flexible substrate;
the first wiring is partly located under the first IC chip in the first area; and
the flexible substrate is connected to the second terminal.

17. The sensor-equipped display device of claim 13, further comprising a flexible substrate, a first IC chip, and a second IC chip, wherein:

the second IC chip includes the detection circuit and is connected to the flexible substrate;
the first substrate further comprises, in the first area, a fourth terminal, a fifth terminal, and a second wiring which electrically connects the fourth terminal and the fifth terminal;
the first IC chip is connected to each of the second terminal and the fourth terminal, and electrically connects the second terminal and the fourth terminal therein; and
the flexible substrate is connected to the fifth terminal.

18. A sensor-equipped display device comprising:
a first substrate comprising a first area and a second area including a display area adjacent to the first area, the first substrate comprising first and second terminals located in the first area, a first wiring which electrically connects the first terminal and the second terminal, and a sensor driving electrode located in the second area and including a common electrode arranged over a plurality of pixels;
a second substrate opposed to the second area, the second substrate comprising a detection electrode opposed to the sensor driving electrode, and a third terminal electrically connected to the detection electrode;
a connecting member which electrically connects the first terminal and the third terminal;
a common electrode drive circuit electrically connected to the sensor driving electrode; and
a detection circuit electrically connected to the second terminal, wherein
the first area is an area in which the second substrate does not overlap the first substrate,
the second area is an area in which the first substrate and the second substrate overlap each other,
the connecting member is electrically connected to the first substrate in the first area and is electrically connected to the second substrate in the second area,
the connecting member does not extend outside the first substrate in a planar view,
the first substrate has a first surface opposed to the second substrate,
the first surface extends in the first area and the second area,
the first terminal is located on the first surface of the first area,
the second substrate has a second surface opposed to the first substrate and a third surface on an opposite side to the second surface,
the third terminal is located on the third surface,
the connecting member is a flexible printed circuit board and includes a base layer and a conductive layer provided on an undersurface of the base layer, and the undersurface is opposed to the first surface and the third surface, and
the conductive layer electrically connects the first terminal and the third terminal.

* * * * *